US012135513B2

(12) United States Patent
Abe et al.

(10) Patent No.: US 12,135,513 B2
(45) Date of Patent: Nov. 5, 2024

(54) TONER CONVEYING APPARATUS HAVING TONER CONVEYING PATHS AND IMAGE FORMING APPARATUS

(71) Applicant: CANON KABUSHIKI KAISHA, Tokyo (JP)

(72) Inventors: Tsukasa Abe, Kanagawa (JP); Fumihiko Yamaya, Shizuoka (JP); Mitsuyoshi Arakawa, Tokyo (JP); Takashi Kuwata, Shizuoka (JP); Shinichi Ueda, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/228,766

(22) Filed: Aug. 1, 2023

(65) Prior Publication Data

US 2023/0375962 A1 Nov. 23, 2023

Related U.S. Application Data

(63) Continuation of application No. 17/690,110, filed on Mar. 9, 2022, now Pat. No. 11,782,361, which is a (Continued)

(30) Foreign Application Priority Data

Nov. 15, 2019 (JP) ................................ 2019-207170
Nov. 15, 2019 (JP) ................................ 2019-207220
Nov. 15, 2019 (JP) ................................ 2019-207246

(51) Int. Cl.
*G03G 15/08* (2006.01)

(52) U.S. Cl.
CPC ..... *G03G 15/0891* (2013.01); *G03G 15/0877* (2013.01); *G03G 15/0879* (2013.01); *G03G 2215/068* (2013.01)

(58) Field of Classification Search
CPC .......... G03G 15/0891; G03G 15/0877; G03G 15/0879; G03G 21/10; G03G 21/105;
(Continued)

(56) References Cited

U.S. PATENT DOCUMENTS 5,231,458 A * 7/1993 Nishimura .......... G03G 21/105 399/253
5,250,997 A 10/1993 Kaneko et al.
(Continued)

FOREIGN PATENT DOCUMENTS

CN 101169617 A 4/2008
CN 101464648 A 6/2009
(Continued)

OTHER PUBLICATIONS

European Search Report dated Feb. 25, 2021, in related European Patent Application No. 20207104.9.
(Continued)

*Primary Examiner* — Arlene Heredia
*Assistant Examiner* — Laura Roth
(74) *Attorney, Agent, or Firm* — VENABLE LLP

(57) ABSTRACT

An image forming apparatus includes a cartridge, including a photosensitive drum and a cleaning member, and an apparatus main body to and from which the cartridge and a toner container are independently attached and detached The apparatus main body includes a toner conveying apparatus receive toner removed from the cartridge and convey the removed toner to the toner container. The toner conveying apparatus includes a first conveying portion to convey the removed toner received from the cartridge toward the toner container, and a second conveying portion to convey the removed toner conveyed by the first conveying portion to the toner container.

15 Claims, 15 Drawing Sheets

A-A' CROSS-SECTION

Related U.S. Application Data continuation of application No. 17/094,953, filed on Nov. 11, 2020, now Pat. No. 11,300,901.

(58) Field of Classification Search

CPC ..... G03G 2215/068; G03G 2215/0665; G03G 2221/1624

See application file for complete search history.

(56) References Cited

U.S. PATENT DOCUMENTS

| | | | | |
|---|---|---|---|---|
| 6,014,541 | A * | 1/2000 | Kato .................... | G03G 21/105 399/358 |
| 7,627,272 | B2 | 12/2009 | Iwamura | |
| 7,664,453 | B2 | 2/2010 | Morishita | |
| 7,817,943 | B2 | 10/2010 | Utsumi et al. | |
| 7,917,076 | B2 | 3/2011 | Inoue | |
| 8,155,569 | B2 | 4/2012 | Yoshikawa et al. | |
| 8,731,443 | B2 | 5/2014 | Mihara et al. | |
| 8,744,320 | B2 | 6/2014 | Mihara et al. | |
| 8,862,043 | B2 | 10/2014 | Kebata et al. | |
| 8,897,676 | B2 | 11/2014 | Nakaue et al. | |
| 9,046,819 | B2 | 6/2015 | Furuki et al. | |
| 9,823,618 | B2 | 11/2017 | Ueno et al. | |
| 10,156,811 | B2 | 12/2018 | Hamada et al. | |
| 10,642,192 | B2 | 5/2020 | Ariizumi et al. | |
| 2003/0072592 | A1 | 4/2003 | Itoh et al. | |
| 2008/0056772 | A1 | 3/2008 | Utsumi et al. | |
| 2008/0145105 | A1 | 6/2008 | Iwamura | |
| 2009/0074470 | A1* | 3/2009 | Kouzu ................. | G03G 21/105 399/257 |
| 2009/0232548 | A1 | 9/2009 | d'Entrecasteaux | |
| 2010/0172674 | A1 | 7/2010 | Suzuki | |
| 2010/0272476 | A1 | 10/2010 | Shima et al. | |
| 2011/0081167 | A1 | 4/2011 | Tanaka | |
| 2011/0255907 | A1 | 10/2011 | Mihara et al. | |
| 2011/0286770 | A1 | 11/2011 | Hayashi et al. | |
| 2012/0263502 | A1 | 10/2012 | Nakaue et al. | |
| 2014/0079414 | A1 | 3/2014 | Amauchi et al. | |
| 2016/0139541 | A1 | 5/2016 | Inada et al. | |
| 2016/0154341 | A1* | 6/2016 | Hamada ............. | G03G 15/0891 399/358 |
| 2017/0219960 | A1 | 8/2017 | Sato | |
| 2018/0253033 | A1 | 9/2018 | Fujishima et al. | |
| 2019/0377283 | A1 | 12/2019 | Suzuki et al. | |
| 2020/0033787 | A1* | 1/2020 | Shiobara ................ | G03G 21/12 |
| 2020/0064773 | A1* | 2/2020 | Sato ................... | G03G 21/1821 |

FOREIGN PATENT DOCUMENTS

| | | | |
|---|---|---|---|
| CN | 102221804 | A | 10/2011 |
| CN | 102854773 | A | 1/2013 |
| EP | 3165971 | A2 | 5/2017 |
| JP | S63-163883 | A | 7/1988 |
| JP | H05-249866 | A | 9/1993 |
| JP | 2003-173118 | A | 6/2003 |
| JP | 2005-121856 | A | 5/2005 |
| JP | 2005-275021 | A | 10/2005 |
| JP | 2008-058339 | A | 3/2008 |
| JP | 2008-151997 | A | 7/2008 |
| JP | 2008-304846 | A | 12/2008 |
| JP | 2010-175836 | A | 8/2010 |
| JP | 2012141453 | A | 7/2012 |
| JP | 2012230358 | A | 11/2012 |
| JP | 2013-088636 | A | 5/2013 |
| JP | 2013-200405 | A | 10/2013 |
| JP | 2014157350 | A | 8/2014 |
| JP | 2015-230408 | A | 12/2015 |
| JP | 2016031497 | A | 3/2016 |
| JP | 2016-065917 | A | 4/2016 |
| JP | 2016-142873 | A | 8/2016 |
| JP | 5994662 | B1 | 9/2016 |
| JP | 2016-218288 | A | 12/2016 |
| JP | 2017-040725 | A | 2/2017 |
| JP | 2018-132574 | A | 8/2018 |
| JP | 6380349 | B2 | 8/2018 |
| JP | 2018128646 | A | 8/2018 |
| JP | 2019-128456 | A | 8/2019 |
| KR | 101434748 | B1 | 8/2014 |

OTHER PUBLICATIONS

Indian Office Action dated Jul. 30, 2021, in related Indian Patent Application No. 202044049204.

Russian Notice of Allowance dated Sep. 13, 2021, in related Russian Patent Application No. 2020137286 (with English translation).

Russian Notice of Allowance dated Jun. 7, 2022, in related Russian Patent Application No. 2021132923 (with English translation).

Chinese Notice of Allowance dated May 29, 2023, in related Chinese Patent Application No. 202011263381.4.

* cited by examiner

A1-A2 CROSS-SECTION

B1-B2 CROSS-SECTION (UPSTREAM SIDE SCREW 1050 IS NOT ILLUSTRATED)

A1-A2 CROSS-SECTION

B1-B2 CROSS-SECTION
(UPSTREAM SIDE SCREW 1050 IS NOT ILLUSTRATED)
(DOWNSTREAM SIDE SCREW 1140 IS NOT ILLUSTRATED)

B-B' CROSS-SECTION
(UPSTREAM SIDE SCREW 105 IS NOT ILLUSTRATED)

A-A' CROSS-SECTION

TONER CONVEYING APPARATUS HAVING TONER CONVEYING PATHS AND IMAGE FORMING APPARATUS

This application is a continuation of application Ser. No. 17/690,110 filed Mar. 9, 2022, which is a continuation of application Ser. No. 17/094,953, filed Nov. 11, 2020, now U.S. Pat. No. 11,300,901, issued Apr. 12, 2022.

BACKGROUND OF THE INVENTION

Field of the Invention

The present invention relates to a toner conveying apparatus that conveys toner, and an electrophotographic type image forming apparatus equipped with the toner conveying apparatus.

Description of the Related Art

A conventional electrophotographic type image forming apparatus, such as a printer, a copier and a facsimile, is constituted of three components: a toner containing unit that stores toner in advance; a particle conveying unit that conveys toner; and an image forming portion that is disposed on the downstream side of the particle conveying unit. As a configuration that is used to convey the toner, there is a configuration in which a helical screw, which has a rotation shaft at the center, is disposed in a conveying passage and the toner is conveyed from upstream to downstream of the conveying passage by rotating the helical screw.

Japanese Patent Application Publication No. 2014-157350 discloses a configuration for dropping and conveying toner from a toner supply port to a developing apparatus, with the toner being conveyed via a toner conveying passage from a toner bottle, which is disposed on the upper side of a toner containing unit in the vertical direction. In the configuration illustrated in FIG. 9 and FIG. 11 of Japanese Patent Application Publication No. 2014-157350, a conveying direction and height of the toner is changed by a plurality of screws disposed in the toner conveying passage, constituted of a plurality of conveying passages which are interconnected, so as to convey the toner to a desired toner supply port.

For example, in the configuration illustrated in FIG. 10 of Japanese Patent Application Publication No. 2014-157350, two screws are disposed so as to cross in the virtual direction, so that toner is passed from upstream to downstream. At a transfer portion where the toner is passed, a downstream side edge of an upstream side screw and an upstream side edge of a downstream side screw are disposed so as to cross in the vertical direction. When the toner conveyed by the upstream side screw reaches the downstream side edge of the upstream side screw, the toner is guided to the downstream side screw with the assistance of gravity. Then the toner is further conveyed to the downstream side by the downstream side screw.

Japanese Patent Application Publication No. 2012-230358 as well discloses a configuration in which two screws are disposed to cross in the vertical direction so that toner is transferred by passing the toner from the upstream side screw onto the downstream side screw. As illustrated in FIG. 8 of Japanese Patent Application Publication No. 2012-230358, the upstream side screw and the downstream side screw cross in the vertical direction so that the toner is conveyed to the downstream side in the conveying direction.

SUMMARY OF THE INVENTION

In these prior arts, at the transfer portion where the toner is passed from the upstream side screw onto the downstream side screw, the toner is subject to gravity, in addition to the conveying force of the screw. By the totality of gravity and the conveying force of the screw, the toner is pushed out of the conveying passage where the upstream side crew is disposed, and the toner flows into the conveying passage (downstream side of the toner conveying passage) where the downstream side screw is disposed. Hence, it is demanded to improve the toner conveying efficiency on the downstream side of the toner conveying passage.

With the foregoing in view, it is an object of the present invention to improve toner conveying efficiency on a downstream side of a toner conveying apparatus.

To achieve the above object, a toner conveying apparatus that conveys toner used for image formation of the present invention includes:

a first conveying portion configured to convey toner, the first conveying portion having a first screw that includes a first rotation shaft and a first blade portion and is rotatable, and a first conveying passage forming member that forms a first conveying space by surrounding the first screw; and a second conveying portion configured to convey upward the toner conveyed by the first conveying portion, the second conveying portion having a second screw that includes a second rotation shaft and a second blade portion and is rotatable, and a second conveying passage forming member that forms a second conveying space by surrounding the second screw and that includes a connecting portion connected to the first conveying passage forming member, wherein in a toner conveying direction of the first screw, the first conveying space of the first conveying portion includes a first region and a second region that is closer to the connecting portion than the first region is, wherein a cross-sectional area of the first conveying space in a direction vertical to a direction of a rotation axial line of the first rotation shaft is smaller in the second region than in the first region.

According to the present invention, the toner conveying efficiency on the downstream side of the toner conveying apparatus can be improved.

Further features of the present invention will become apparent from the following description of exemplary embodiments with reference to the attached drawings.

DESCRIPTION OF THE EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments do not intend to limit the scope of the invention to the following embodiments.

Embodiment 1

Figure 4:
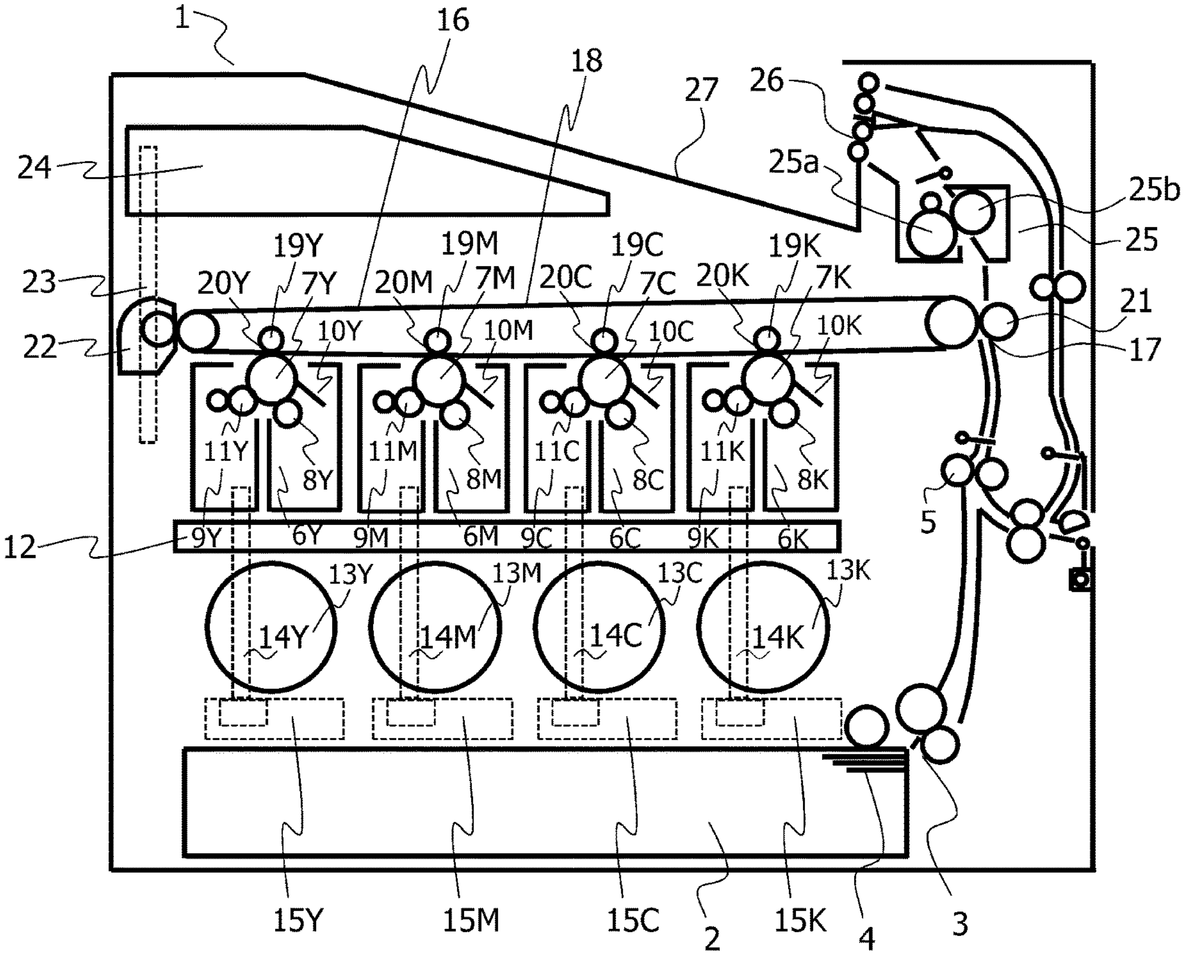
FIG. 4 is a schematic cross-sectional view of an image forming apparatus according to Embodiment 1 of the present invention.

An image forming apparatus 1 according to Embodiment 1 of the present invention will be described with reference to FIG. 4. FIG. 4 is a schematic cross-sectional view illustrating a general configuration of the image forming apparatus 1, and is a cross-sectional view when the image forming apparatus 1 is viewed from the front side. FIG. 4 indicates a configuration of the image forming apparatus 1 in a normal installation state where the image forming apparatus 1 is disposed on a horizontal installation surface, and the left-right direction in FIG. 4 corresponds to the horizontal direction, and the up-down direction in FIG. 4 corresponds to the vertical direction of the apparatus.

The image forming apparatus 1 includes, as an image forming unit, an image forming portion 6, constituted of each image forming station 6Y, 6M, 6C and 6K which corresponds to the toner (developer) of each color: yellow (Y), magenta (M), cyan (C) and black (K) respectively, and is disposed horizontally in a line. Inside the image forming portion 6, each photosensitive drum (image bearing members) 7Y, 7M, 7C and 7K (hereafter photosensitive drum 7) and each charging apparatus 8Y, 8M, 8C and 8K (hereafter charging apparatus 8) which uniformly charges the surface of the photosensitive drum 7 uniform, are disposed. Further, inside the image forming portion 6, each developing apparatus 9Y, 9M, 9C and 9K (hereafter developing apparatus 9), which attaches toner to an electrostatic latent image and develops the image as a toner image (developer image), is disposed. Furthermore, inside the image forming portion 6, each photosensitive member cleaning blade 10Y, 10M, 10C and 10K (hereafter photosensitive member cleaning blade 10), which removes residual toner remaining on the photosensitive drum 7, is disposed. In the developing apparatus 9, each developing roller 11Y, 11M, 11C and 11K (hereafter developing roller 11), corresponding to each color, is disposed such that contacting to and separating from each photosensitive drum 7 are possible. The developing roller 11 is contacted or released in accordance with the electrostatic latent image, that is, in accordance with the requirements of development, so as to improve the product life of the developing roller 11. Moreover, a scanner unit 12, which emits a laser beam based on the image information and forms an electrostatic latent image on the photosensitive drum 7, is disposed under the image forming portion 6. Each image forming station 6Y, 6M, 6C and 6K is configured as a process cartridge, so as to be detachable from the apparatus main body of the image forming apparatus 1. The process cartridge is configured to attach/detach the developing apparatus 9 equipped with the developing roller 11 and the photosensitive unit equipped with the photosensitive drum 7, the charging apparatus 8 and the photosensitive member cleaning blade 10, to/from the apparatus main body individually or integratedly. In Embodiment 1, the developing apparatus 9 includes its own toner containing chamber, so that toner supplied from a replenishing toner container (toner cartridge) 13, which is a containing portion, is replenished to the toner containing chamber. Here the apparatus main body of the image forming apparatus 1 is referred to as the image forming apparatus 1, excluding the configuration portion is detachable from the image forming apparatus, such as the above mentioned process cartridge and the replenishing toner container 13.

In a lower part of the image forming apparatus 1, a drawer-shaped cassette 2 is housed. In the cassette 2, recording material 4, such as papers and sheets, is stored. The recording material 4 is separated and fed one-by-one by rotation of a paper feeding cassette portion 3 which is disposed near the front end of the recording material 4. Then each sheet of the recording material 4 is conveyed downstream by a resist roller 5.

An intermediate transfer unit 16 is disposed above the developing apparatus 9. The intermediate transfer unit 16 is disposed in an approximately horizontal position, so that the lower part thereof is the side facing each image forming station (image forming portion) 6 (on a side of the primary transfer portion 20). An intermediate transfer belt 18 which faces each photosensitive drum 7 is a rotatable endless belt, and is stretched by a plurality of stretching rollers. Each primary transfer roller 19Y, 19M, 19C and 19K (hereafter primary transfer roller 19) is disposed on the inner surface side of the intermediate transfer belt 18 as a primary transfer member. Each primary transfer roller 19 is disposed at a position so as to form each primary transfer portion 20Y, 20M, 20C and 20K (hereafter primary transfer portion 20) with each photosensitive drum 7 respectively via the intermediate transfer belt 18. A toner image is transferred from each photosensitive drum 7 to the intermediate transfer belt 18 in each primary transfer portion 20 by the primary transfer roller 19 to which voltage is applied. In Embodiment 1, a unit constituted of the intermediate transfer belt 18, a plurality of stretching rollers to stretch the intermediate transfer belt 18, and each primary transfer roller 19 can be detachable from the apparatus main body as an intermediate transfer unit 16.

The toner image developed by each image forming station is transferred to the intermediate transfer belt 18 by the primary transfer portion 20, and by sequentially transferring each color, a four-color toner image is formed on the surface of the intermediate transfer belt 18, and is conveyed to a secondary transfer portion 17.

In a lower part of the image forming portion 6, each replenishing toner container 13Y, 13M, 13C and 13K (hereafter replenishing toner container 13), which replenishes toner to each image forming station (image forming portion) 6, is detachably disposed approximately horizontally between the scanner unit 12 and the cassette 2. The replenishing toner container 13, which is also called a toner replenishing cartridge, stores toner. Replenishing toner corresponding to each color is filled in the replenishing toner container 13. Each toner conveying apparatus 14Y, 14M, 14C and 14K (hereafter toner conveying apparatus 14) conveys toner received from the replenishing toner container 13 upward in accordance with the consumption of toner inside the image forming portion 6, and supplies the toner to the developing apparatus 9. The toner conveying apparatus 14 conveys toner used to form an image. The toner conveying apparatus 14, which is a toner conveying portion, is driven by each toner conveying driving apparatus 15Y, 15M, 15C and 15K (hereafter toner conveying driving apparatus 15), which is a driving unit disposed below the toner conveying apparatus 14. The toner conveying driving apparatus 15 includes: a motor, i.e., power source, to provide driving force to drive each screw of the toner conveying apparatus 14 to the toner conveying apparatus 14 via a later mentioned upstream side driving gear 1030 and downstream side driving gear 1120 and the like; and a gear which functions as a driving transfer unit.

A secondary transfer roller 21, which is a secondary transfer member, contacts the intermediate transfer belt 18 so as to form the secondary transfer portion 17 with a roller on the opposite side via the intermediate transfer belt 18. The toner image transferred onto the intermediate transfer belt 18 by the secondary transfer portion 17 is secondarily transferred to the recording material 4. Toner that remains on the intermediate transfer belt 18 without being transferred to the recording material 4 in the secondary transfer is removed by a cleaning unit 22. The toner removed by the cleaning unit 22 is conveyed to a toner collecting container 24 via a toner conveying portion 23, and stored in the toner collecting container 24.

The recording material 4, onto which an unfixed toner image is transferred is further conveyed to the downstream side, and is pressed and heated by a heating unit 25*a* and a pressure roller 25*b* of a fixing apparatus 25, and the toner image is fixed to the recording material 4 by the melted toner. Then the recording material 4 is conveyed by a discharging roller pair 26 and discharged to a paper delivery tray 27. By this series of operations, an image is formed on the surface of the recording material 4.

Toner Conveying Apparatus

Figure 1:
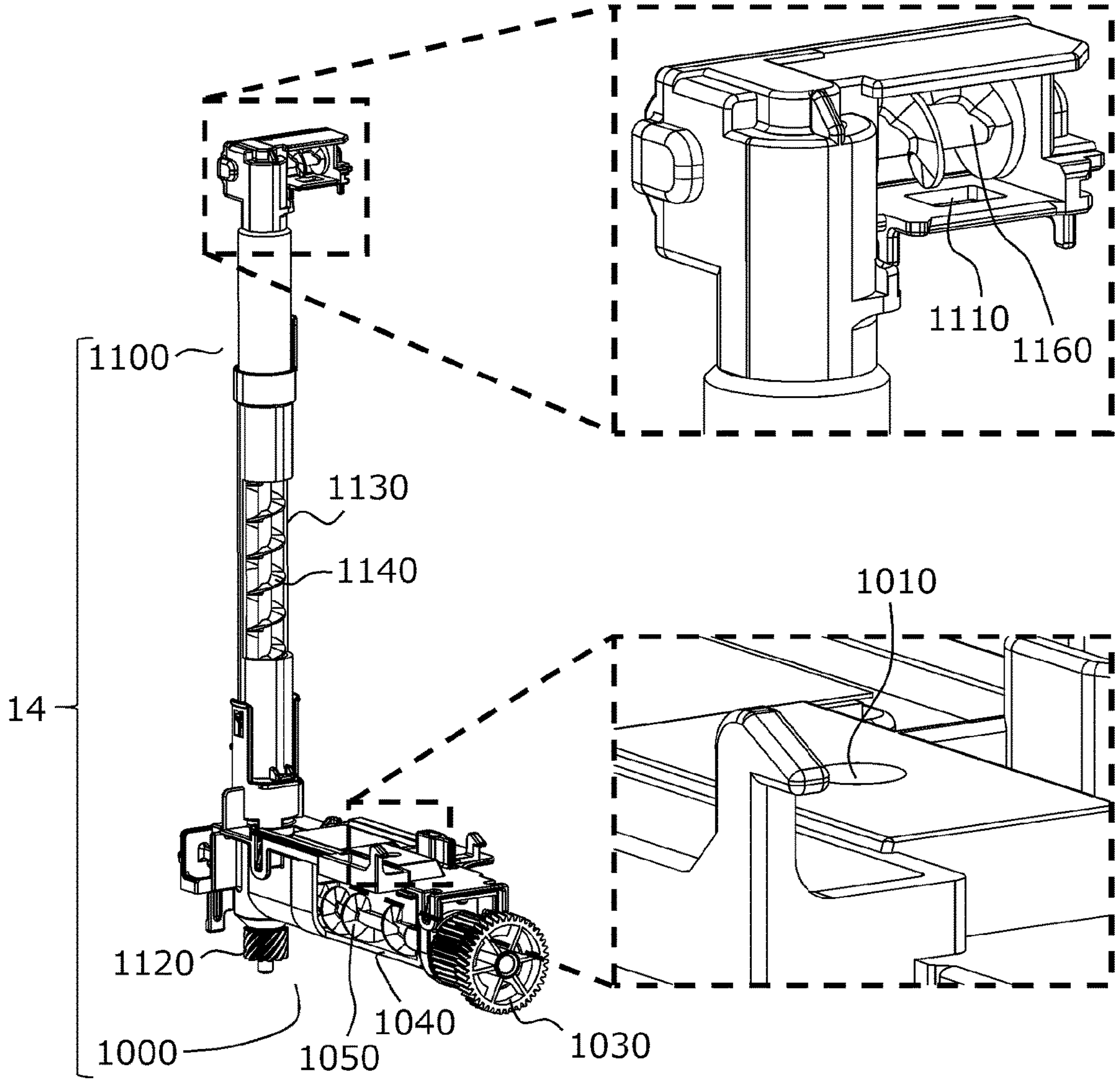
FIG. 1 is a perspective view of a toner conveying apparatus according to Embodiment 1 of the present invention.

FIG. 1 is a schematic perspective view illustrating a general configuration of the toner conveying apparatus 14 equipped in the image forming apparatus 1 of Embodiment 1. In the illustration in FIG. 1, a part of the toner conveying apparatus 14 is omitted in order to indicate the internal configuration thereof.

The toner conveying apparatus 14 is largely constituted of an upstream side conveying portion 1000, i.e., first conveying portion and a downstream side conveying portion 1100, i.e., second conveying portion. The upstream side conveying portion 1000 and the downstream side conveying portion 1100 convey toner which the image forming portion 6 uses for image forming. The downstream side conveying portion 1100 conveys the toner conveyed by the upstream side conveying portion 1000 upward in the vertical direction.

A supply port (opening) 1010, to supply toner to the upstream side conveying portion 1000, is disposed on the upper surface of the upstream side conveying portion 1000. The toner supplied from the replenishing toner container 13 illustrated in FIG. 4 is supplied into the first toner conveying passage which is formed by an upstream side wall portion 1040 of the upstream side conveying portion 1000, through the supply port 1010. The supplied toner is conveyed by rotation of an upstream side screw 1050, i.e., first screw disposed so as to be covered by the upstream side wall portion 1040 of the upstream side conveying portion 1000. The upstream side screw 1050 is rotary-driven by the rotary-driving force transferred from a toner conveying driving apparatus 15 to an upstream side driving gear 1030. The upstream side screw 1050 conveys the toner toward the downstream side conveying portion 1100.

A downstream side screw 1140 is disposed inside the downstream side conveying portion 1100, so as to be covered by a downstream side wall portion 1130 of the downstream side conveying portion 1100. The most upstream portion of the downstream side conveying portion 1100 is connected to a most downstream portion of the upstream side conveying portion 1000. The toner conveyed by the upstream side screw 1050 of the upstream side conveying portion 1000 is supplied to inside the second toner conveying passage, which is formed by the downstream side wall portion 1130 of the downstream side conveying portion 1100. The toner inside the downstream side conveying portion 1100 is conveyed by rotation of the downstream side screw 1140, i.e., second screw. The downstream side screw 1140 is rotary-driven by the rotary-driving force transferred from the toner conveying driving apparatus 15 to a downstream side driving gear 1120, and the downstream side screw 1140 conveys the toner in the opposite direction of the gravity direction (upward in the vertical direction). The toner conveyed in the opposite direction of the gravity direction by the downstream side screw 1140 is further conveyed by a discharging screw 1160, i.e., third screw, and is discharged from the downstream side conveying portion 1100 via a discharging port 1110. The discharging screw 1160 has a rotation shaft and is rotatable. An upstream side edge of the discharging screw 1160 contacts a downstream side edge of the downstream side screw 1140 so as to be drive-coupled, and the discharging screw 1160 is rotated by the driving force received from the rotating downstream side screw 1140. The toner discharged from the discharging port 1110 by the discharging screw 1160 is supplied (replenished) to the developing apparatus 9 illustrated in FIG. 4.

Figure 9:
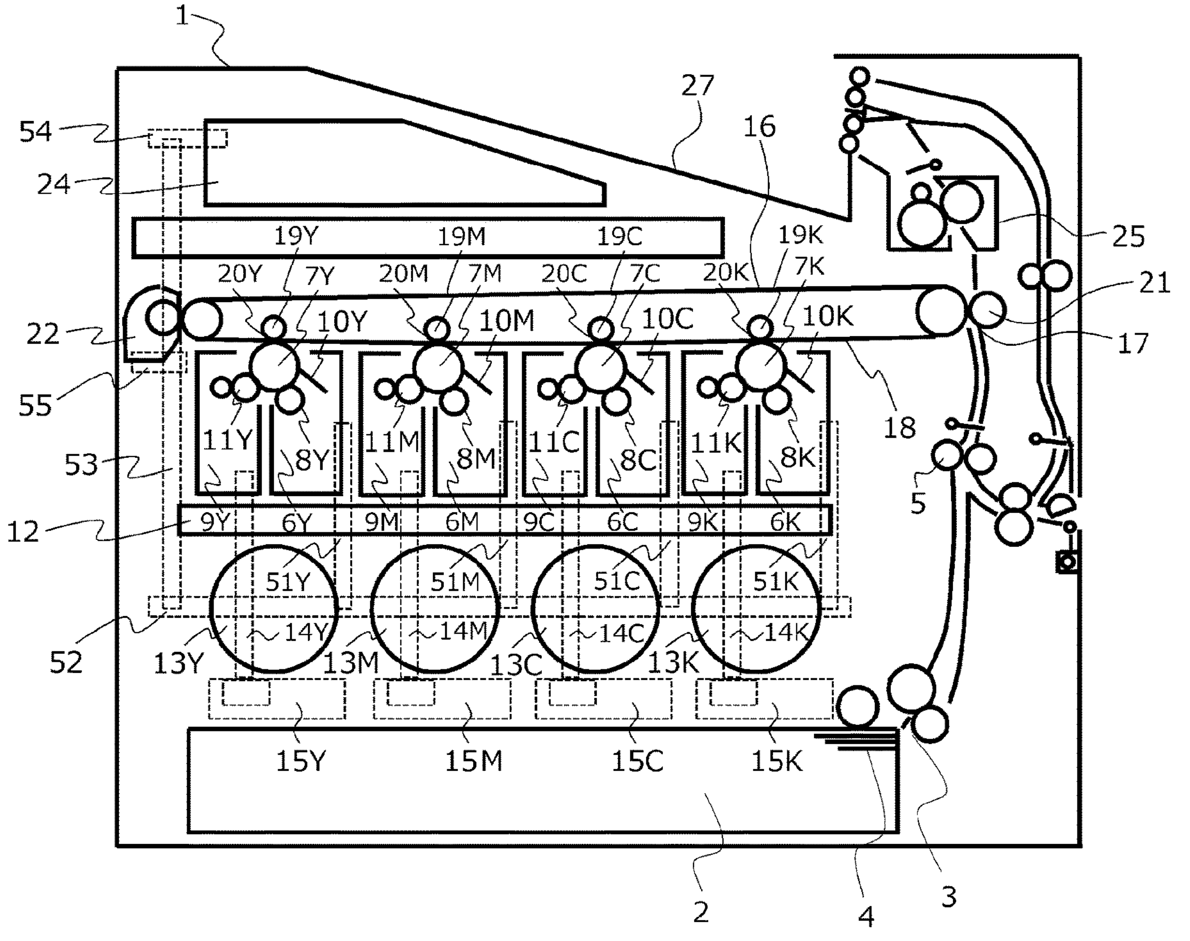
FIG. 9 is a schematic cross-sectional view of an image forming apparatus according to Embodiment 4 of the present invention.

In a conventional configuration, even if a space is created above the screw in the cross-sectional view sectioned in the shaft direction of the screw disposed horizontally, as illustrated in FIG. 9 of Japanese Patent Application Publication No. 2014-157350, for example, the toner is conveyed in the axis direction of the screw without entering the space. In this case, the conveying force applied to the toner when the toner is transferred from the upstream side screw to the downstream side screw is a totality of the conveying force in the radial direction generated by the screw and gravity.

Therefore in the case of the following configurations (1) and (2), in some cases toner may not be smoothly conveyed since the conveying force of the screw in the radial direction alone is insufficient.

The configurations are (1) a configuration in which the downstream side screw is located above the upstream side screw in the vertical direction, and (2) a configuration in which the conveying passage is inclined so that the edge of the downstream side screw becomes higher as the downstream of the conveying passage is approached.

In the case of the above configurations (1) and (2), the conveying efficiency drops because of the transfer portion between the upstream side screw and the downstream side screw. This results in a drop in the maximum conveying force of the entire system with respect to the maximum conveying force of each screw.

Therefore in a conventional image forming apparatus, the toner amount required by a process cartridge is set, and in order to satisfy the toner amount that is set, the rotation speed of the screws is increased so that the toner conveying amount becomes sufficient.

However, although the required toner conveying amount is satisfied, the operating sound increases as the rotation speed of the screws increases. Further, the product life of the apparatus decreases since a cumulative rotation speed of the screws in the particle conveying apparatus increases during a product life cycle of the image forming apparatus.

Moreover, if the rotation speed of the screws is increased, damage to the toner is increased due to pressure and rubbing that the toner is subject to during conveying, and the toner may melt, and the melt toner may interrupt the rotation of the screws and cause the conveying passage to clog.

Figure 2A:
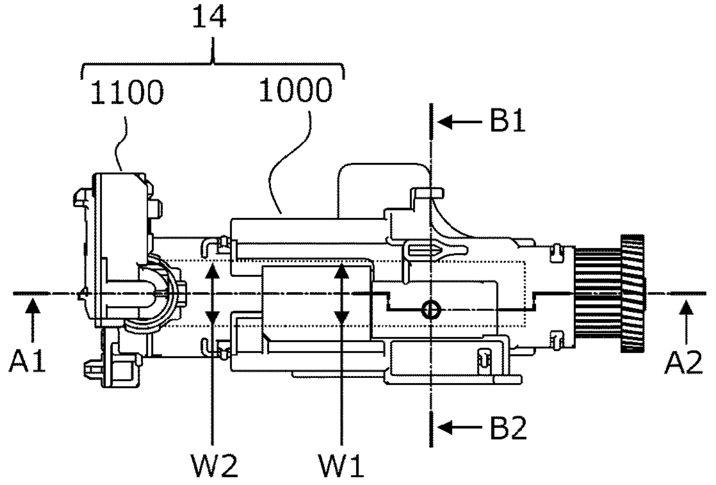
FIG. 2A to FIG. 2C are cross-sectional views of the toner conveying apparatus according to Embodiment 1 of the present invention.
Figure 2B:
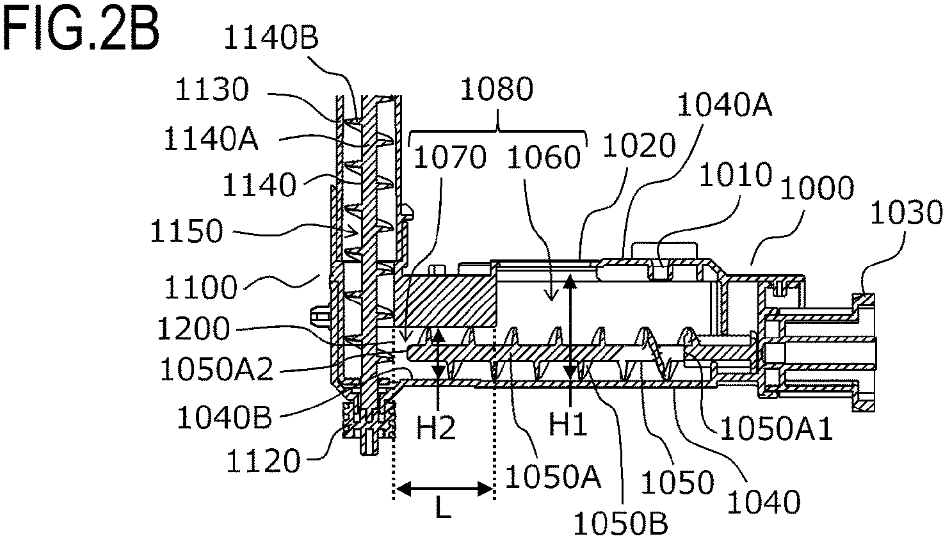
Figure 2C:
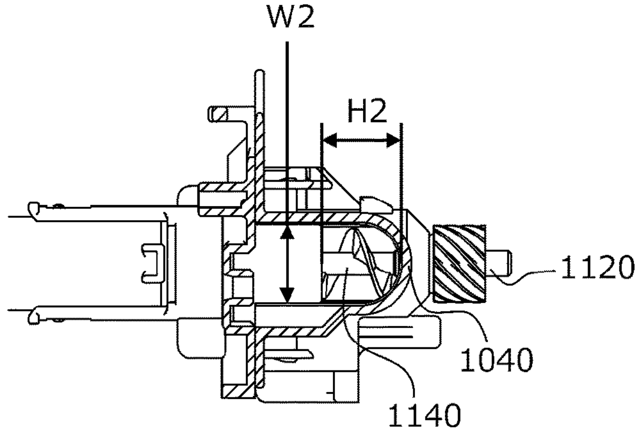

FIG. 2A to FIG. 2C are diagrams illustrating a detailed configuration of a connecting portion (connecting port) 1200 of the downstream side conveying portion 1100, which is connected to the upstream side conveying portion 1000. FIG. 2A is a top view of the toner conveying apparatus 14, FIG. 2B is a cross-sectional view at A1-A2 in FIG. 2A, and FIG. 2C is a cross-sectional view at B1-B2 in FIG. 2A. The connecting portion 1200 of the downstream side conveying portion 1100 is an opening formed in the downstream side conveying portion 1100, and is connected to an opening formed in the upstream side conveying portion 1000. Toner inside the upstream side conveying portion 1000 is conveyed by the upstream side screw 1050 in the part where the connecting portion 1200 of the downstream side conveying portion 1100 is disposed. The connecting portion 1200 of the downstream side conveying portion 1100 is disposed on the downstream side of the upstream side screw 1050 in the toner conveying direction. The toner inside the upstream side conveying portion 1000 flows into the downstream side conveying portion 1100 via the connecting portion 1200 of the downstream side conveying portion 1100.

As illustrated in FIG. 2B, a degassing member 1020 is disposed on the upper surface of the upstream side conveying portion 1000. The degassing member 1020 is constituted of a non-woven fabric so that air is passed without passing toner. If this degassing member 1020 were not used, the air pressure in the upstream side conveying portion 1000 would increase when the toner is supplied from the replenishing toner container 13 illustrated in FIG. 4. An increase in this air pressure generates a pressure difference from the pressure in the replenishing toner container 13, whereby toner is not supplied from the replenishing toner container 13 into the upstream side conveying portion 1000.

The upstream side conveying portion 1000 includes the upstream side screw 1050 and the upstream side wall portion (first conveying passage forming member) 1040 which surrounds the upstream side screw 1050, so as to create a first conveying space 1080 surrounding the upstream side screw 1050. The upstream side wall portion 1040 surrounds the upstream side screw 1050 and the first conveying space 1080 in the rotating direction of the upstream side screw 1050. The first conveying space 1080 surrounds the upstream side screw 1050 in the rotating direction of the upstream side screw 1050. The first conveying space 1080 includes a first region 1060 and a second region 1070 which is closer to the connecting portion 1200 of the downstream side conveying portion 1100 than to the first region 1060 in the toner conveying direction of the upstream side screw 1050. The upstream side wall portion 1040 includes a first wall portion 1040A surrounding the first region 1060, and a second wall portion 1040B surrounding the second region 1070. The first wall portion 1040A forms the first region 1060 that surrounds the upstream side screw 1050. The second wall portion 1040B forms the second region 1070 that surrounds the upstream side screw 1050.

The upstream side screw 1050 includes a rotation shaft 1050A, i.e., first rotation shaft and a blade portion 1050B, i.e., first blade portion which is disposed helically around the outer periphery of the rotation shaft 1050A. The blade portion 1050B is blade-shaped. The upstream side screw 1050 is rotatably disposed in an approximately horizontal direction inside the upstream side conveying portion 1000 which extends in an approximately horizontal direction. A first portion of the upstream side screw 1050 is disposed in the first region 1060 of the first conveying space 1080 of the upstream side conveying portion 1000, and a second portion of the upstream side screw 1050 is disposed in the second region 1070 of the first conveying space 1080 of the upstream side conveying portion 1000. The first portion of the upstream side screw 1050 includes an upstream end 1050A1 of the rotation shaft 1050A. The second portion of the upstream side screw 1050 is a portion that is different from the first portion of the upstream side screw 1050, and includes a downstream end 1050A2 of the rotation shaft 1050A. The upstream end 1050A1 of the rotation axis 1050A is disposed in the first region 1060 of the first conveying space 1080 of the upstream side conveying portion 1000, and the downstream end 1050A2 of the rotation shaft 1050A is disposed in the second region 1070 of the first conveying space 1080 of the upstream side conveying portion 1000. The upstream end 1050A1 of the rotation shaft 1050A may be disposed in a region outside the upstream side conveying portion 1000, instead of being disposed in the first region 1060 of the first conveying space 1080 of the upstream side conveying portion 1000.

The downstream side conveying portion 1100 includes the downstream side screw 1140 and the downstream side wall portion (second conveying passage forming member) 1130 which forms a second conveying space 1150 surrounding the downstream side screw 1140. The downstream side wall portion 1130 surrounds the downstream side screw 1140 and the second conveying space 1150 in the rotating direction of the downstream side screw 1140. The second conveying space 1150 surrounds the downstream side screw 1140 in the rotating direction of the downstream side screw 1140. The downstream side wall portion 1130 includes the connecting portion 1200. The connecting portion 1200 of the downstream side wall portion 1130 is connected to the upstream side wall portion 1040. The second region 1070 of the first conveying space of the upstream side conveying portion 1000 is connected to the second conveying space 1150 created inside the downstream side conveying portion 1100 via the connecting portion 1200. The connecting portion 1200 is disposed in the axial line direction of the rotation shaft 1050A of the upstream side screw 1050. The configuration is not limited to this, but the connecting portion 1200 of the downstream side conveying portion 1100 may be disposed in the horizontal direction, and in the direction perpendicular to the axial line direction of the rotation shaft 1050A of the upstream side screw 1050. The downstream side screw 1140 includes a rotation shaft 1140A, i.e., second rotation shaft and a blade portion 1140B, i.e., second blade portion which is disposed helically around the outer periphery of the rotation shaft 1140A. The blade portion 1140B is blade-shaped. The downstream side screw 1140 is rotatably disposed in an approximately vertical direction inside the downstream side conveying portion 1100 which extends in an approximately vertical direction. The toner conveying direction of the downstream side screw 1140 is, for example, the axial line direction of the rotation shaft 1140A and upward in the vertical direction.

The first wall portion 1040A includes the supply port 1010 to supply toner to the first region 1060 of the first conveying space 1080. Toner is supplied from the replenishing toner container 13 into the upstream side conveying portion 1000 via the supply port 1010. Because the supply port 1010 is disposed in the first wall portion 1040A, the toner passing through the supply port 1010 is supplied into the first region 1060 of the first conveying space 1080. The supply port 1010 is disposed above the upstream side screw 1050 in the vertical direction. The first region 1060 of the first conveying space 1080 is wider than the second region 1070 of the first conveying space 1080. In other words, the first conveying space 1080 includes the first region 1060 which is wider than the second region 1070. This is because the toner does not overflow from the upstream side conveying portion 1000 even if excessive toner is supplied from the replenishing toner container 13 into the upstream side conveying portion 1000.

The first region 1060 has a cross-sectional area determined by integrating the height H1 of the first region 1060 and the width W1 of the first region 1060 in a cross-section that is vertical to the axial line direction of the rotation shaft 1050A of the upstream side screw 1050. The height H1 of the first region 1060 is the height of the first region 1060 in the vertical direction. The width W1 of the first region 1060 is the width of the first region 1060 in the horizontal direction, and also in the direction perpendicular to the axial line direction of the rotation shaft 1050A of the upstream side screw 1050. The cross-sectional area of the first region 1060 may be calculated by integrating the height and width of the toner conveying passage formed by the first wall portion 1040A when viewed from the cross-section that is vertical to the axial line direction of the rotation shaft 1050A of the upstream side screw 1050. The second region 1070, on the other hand, is narrower than the first region 1060. The second region 1070 has a cross-sectional area determined by integrating the height H2 of the second region 1070 and width W2 of the second region 1070 in a cross-section that is vertical to the axial line direction of the rotation shaft 1050A of the upstream side screw 1050. The height H2 of the second region 1070 is the height of the second region 1070 in the vertical direction. The width W2 of the second region 1070 is the width of the second region 1070 in the horizontal direction, and also in the direction perpendicular to the axial line direction of the rotation shaft 1050A of the upstream side screw 1050. The cross-sectional area of the second region 1070 may be calculated by integrating the height and width of the toner conveying passage formed by the second wall portion 1040B when viewed from the cross-section that is vertical to the axial line direction of the rotation shaft 1050A of the upstream side screw 1050.

The height H2 of the second region 1070 is lower than the height H1 of the first region 1060. The width W1 of the first region 1060 and the width W2 of the second region 1070 are the same. Therefore the cross-sectional area of the second region 1070, that is, the cross-sectional area of the connecting portion 1200 of the downstream side conveying portion 1100, is smaller than the cross-sectional area of the first region 1060. Therefore when toner is conveyed by the upstream side screw 1050 and is transferred to the downstream side screw 1140 of the downstream side conveying portion 1100, the pressure inside the second region 1070 of the first conveying space 1080 becomes higher than the pressure inside the first region 1060 of the first conveying space 1080. In the case where the cross-sectional area of the second region 1070 is smaller than the cross-sectional area of the first region 1060, the height H2 of the second region 1070 may be lower than the height H1 of the first region 1060, and the width W2 of the second region 1070 may be narrower than the width W1 of the first region 1060. Furthermore, in the case where the cross-sectional area of the second region 1070 is smaller than the cross-sectional area of the first region 1060, the height H2 of the second region 1070 may be lower than the height H1 of the first region 1060, and the width W2 of the second region 1070 may be wider than the width W1 of the first region 1060.

In some cases where the pressure inside the second region 1070 of the first conveying space 1080 is low, transferring toner in the opposite direction to the gravity direction by the downstream side screw 1140 may be impossible. In order to set the pressure inside the second region 1070 of the first conveying space 1080 to be higher than the pressure inside the first region 1060 of the first conveying space 1080, the width of the second region 1070 of the first conveying space 1080 is narrower than the width of the width of the first region 1060 of the first conveying space 1080 in this configuration. In other words, the cross-sectional area of the internal space surrounded by the upstream side wall portion 1040 is smaller in the second region 1070 of the first conveying space 1080 than in the first region 1060 of the first conveying space 1080 in the axial line direction of the rotation shaft 1050A of the upstream side screw 1050. The cross-sectional area of the internal space surrounded by the upstream side wall portion 1040 is a cross-sectional area that is vertical to the axial line direction of the rotation shaft 1050A of the upstream side screw 1050. By making the width of the second region 1070 to be narrower than the first region 1060 like this, pressure can be efficiently applied to the connecting portion 1200 of the downstream side conveying portion 1100. As a result, the toner conveying efficiency from the upstream side conveying portion 1000 to the downstream side conveying portion 1100 can be improved. Further, the toner can be easily conveyed by the downstream side screw 1140 in the opposite direction of the gravity direction.

Figure 3:
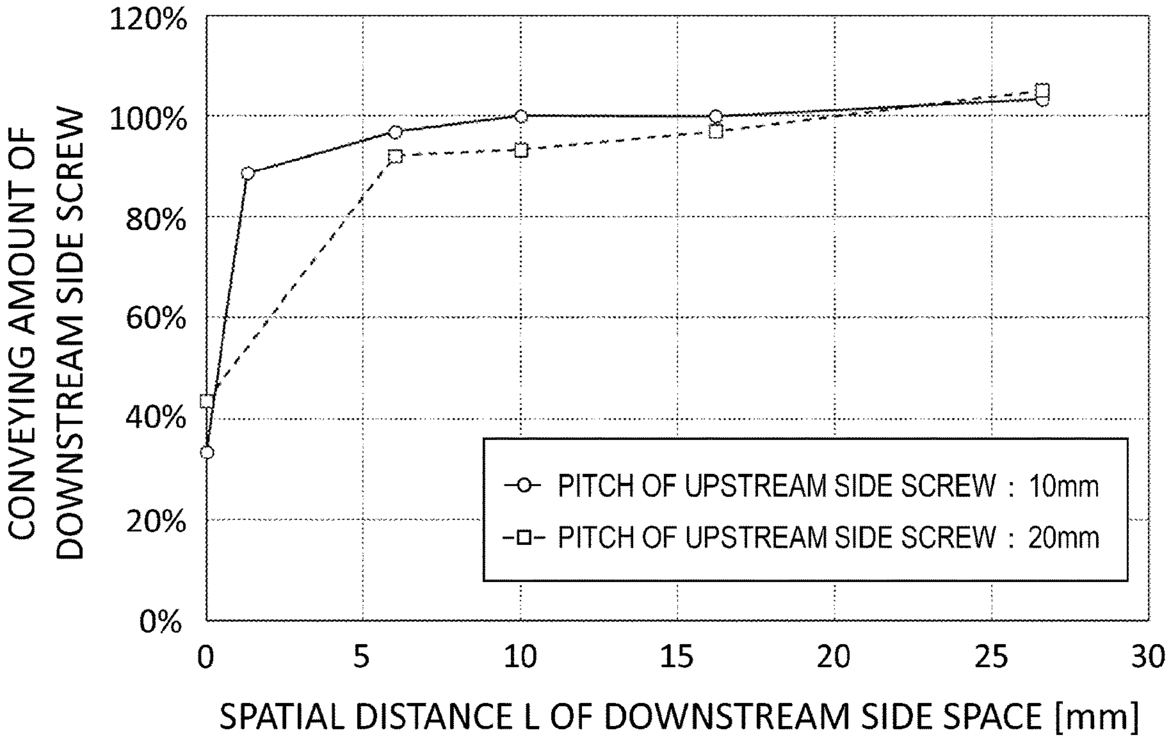
FIG. 3 is a graph depicting a toner conveyability according to Embodiment 1 of the present invention.

FIG. 3 is a graph depicting the relationship between the spatial distance L of the second region 1070 of the first conveying space 1080 illustrated in FIG. 2A to FIG. 2C and the toner conveying amount of the downstream side screw 1140 in the opposite direction of the gravity direction. The abscissa in FIG. 3 indicates the spatial distance L of the second region 1070, and the ordinate in FIG. 3 indicates the toner conveying amount of the downstream side screw 1140 in the opposite direction of the gravity direction. The spatial distance L of the second region 1070 is the length of the second region 1070 in the axial line direction of the rotation shaft 1050A of the upstream side screw 1050. In other words, the spatial distance L is the length of the second wall portion 1040B in the axial line direction of the rotation shaft 1050A of the upstream side screw 1050. The toner conveying amount of the ordinate in FIG. 3 is defined as the ratio (%) with respect to the maximum conveying amount.

Further, FIG. 3 indicates the data on the upstream side screw 1050 which was measured using the blade portion 1050B having a different pitch. For example, the pitch of the blade portion 1050B is a distance between two adjacent protruding portions of the blade portion 1050B when viewed in the direction perpendicular to the axial line direction of the rotation shaft 1050A of the upstream side screw 1050. The solid line in FIG. 3 indicates the measurement result of the upstream side screw 1050 having the blade portion 1050B of which pitch is 10 mm. The dotted line in FIG. 3 indicates the measurement result of the upstream side screw 1050 having the blade portion 1050B of which pitch is 20 mm. In the case of the upstream side screw 1050 having the blade portion 1050B of which pitch is 10 mm, the toner conveying amount is at least 100% when the spatial distance L is at least 10 mm. In the case of the upstream side screw 1050 having the blade portion 1050B of which pitch is 20 mm, the toner conveying amount is at least 100% when the spatial distance L is at least 20 mm. According to the measurement result in FIG. 3, in the case where the spatial distance L is at least one pitch of the blade portion 1050B of the upstream side screw 1050 in the second region 1070, the toner conveying amount of the downstream side screw 1140 in the opposite direction of the gravity direction can be maximized. In Embodiment 1, the blade portion 1050B is disposed in the rotation shaft 1050A so that the size of the pitch of the blade portion 1050B of the upstream side screw 1050 is smaller than the spatial distance L. Therefore in the second region 1070, the blade portion 1050B of the upstream side screw 1050 cycles at least once around the rotation shaft 1050A.

Embodiment 2

Embodiment 2 of the present invention will be described next. An element having a function or a configuration the same as or equivalent to Embodiment 1 is denoted with a same reference sign, and detailed description thereof is omitted.

Figure 5A:
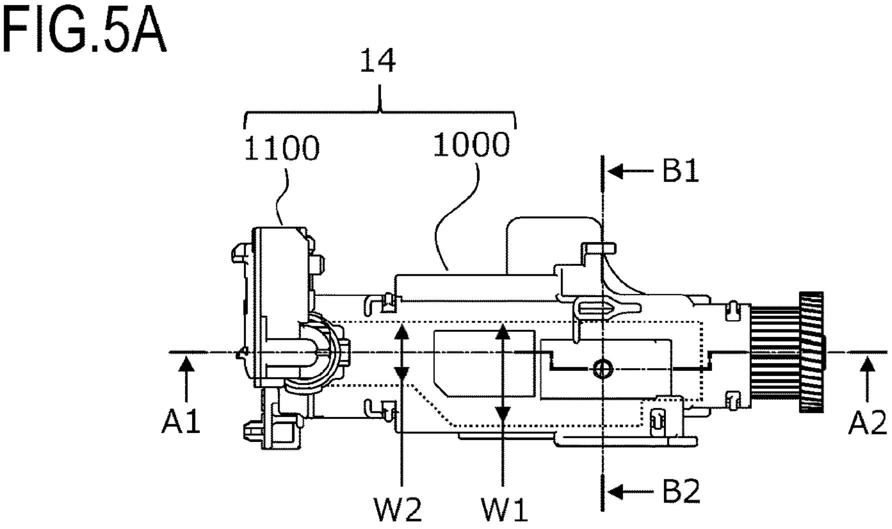
FIG. 5A to FIG. 5C are cross-sectional views of a toner conveying apparatus according to Embodiment 2 of the present invention.
Figure 5B:
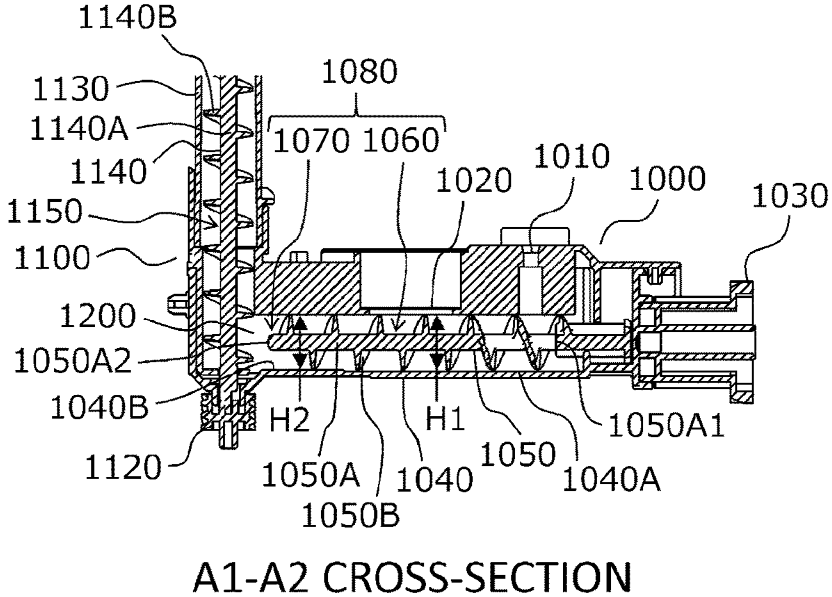
Figure 5C:
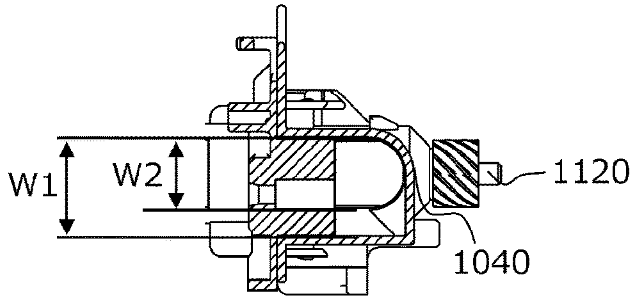

FIG. 5A to FIG. 5C are diagrams illustrating detailed configurations of the connecting portion (connecting port) 1200 of the downstream side conveying portion 1100 that is connected to the upstream side conveying portion 1000 according to Embodiment 2. FIG. 5A is a top view of the toner conveying apparatus 14, FIG. 5B is a cross-sectional view at A1-A2 in FIG. 5A, and FIG. 5C is a cross-sectional view at B1-B2 in FIG. 5A.

FIG. 5A to FIG. 5C indicate the detailed configuration of the connecting portion 1200 of the downstream side conveying portion 1100 according to Embodiment 2. In the configuration of Embodiment 2, unlike Embodiment 1, a difference is created between the first region 1060 and the second region 1070 of the first conveying space 1080 by controlling the width direction of the toner conveying apparatus 14.

The first wall portion 1040A includes the supply port 1010 to supply toner to the first region 1060 of the first conveying space 1080. Toner is supplied from the replenishing toner container 13 into the upstream side conveying portion 1000 via the supply port 1010. Because the supply port 1010 is disposed in the first wall portion 1040A, the toner passing through the supply port 1010 is supplied into the first region 1060 of the first conveying space 1080. The supply port 1010 is disposed above the upstream side screw 1050 in the vertical direction. The first region 1060 of the first conveying space 1080 is wider than the second region 1070 of the first conveying space 1080. In other words, the first conveying space 1080 includes the first region 1060 which is wider than the second region 1070. The first region 1060 has a cross-sectional area determined by integrating the height H1 of the first region 1060 and the width W1 of the first region 1060 in a cross-section that is vertical to the axial line direction of the rotation shaft 1050A of the upstream side screw 1050. The second region 1070, on the other hand, is narrower than the first region 1060. The second region 1070 has a cross-sectional area determined by integrating the height H2 of the second region 1070 and the width W2 of the second region 1070 in a cross-section that is vertical to the axial line direction of the rotation shaft 1050A of the upstream side screw 1050.

The height H1 of the first region 1060 and the height H2 of the second region 1070 are the same. The width W2 of the second region 1070 is narrower than the width W1 of the first region 1060. Therefore the cross-sectional area of the second region 1070, that is, the cross-sectional area of the connecting portion 1200 of the downstream side conveying portion 1100, is smaller than the cross-sectional area of the first region 1060. Therefore when toner is conveyed by the upstream side screw 1050 and is transferred to the downstream side screw 1140 of the downstream side conveying portion 1100, the pressure inside the second region 1070 of the first conveying space 1080 becomes higher than the pressure inside the first region 1060 of the first conveying space 1080. In the case where the cross-sectional area of the second region 1070 is smaller than the cross-sectional area of the first region 1060, the width W2 of the second region 1070 may be narrower than the width W1 of the first region 1060, and the height H2 of the second region 1070 may be lower than the height H1 of the first region 1060. Further, in the case where the cross-sectional area of the second region 1070 is smaller than the cross-sectional area of the first region 1060, the width W2 of the second region 1070 may be narrower than the width W1 of the first region 1060, and the height H2 of the second region 1070 may be higher than the height H1 of the first region 1060.

In some cases where the pressure inside the second region 1070 of the first conveying space 1080 is low, transferring toner in the opposite direction of the gravity direction by the downstream side screw 1140 may be impossible. In order to set the pressure inside the second region 1070 of the first conveying space 1080 to be higher than the pressure inside the first region 1060 of the first conveying space 1080, the width of the second region 1070 of the first conveying space 1080 is narrower than the width of the first region 1060 of the first conveying space 1080. In other words, the cross-sectional area of the internal space surrounded by the upstream side wall portion 1040 is smaller in the second region 1070 of the first conveying space 1080 than in the first region 1060 of the first conveying space 1080 in the axial line direction of the rotation shaft 1050A of the upstream side screw 1050. The cross-sectional area of the internal space surrounded by the upstream side wall portion 1040 is a cross-sectional area that is vertical to the axial line direction of the rotation shaft 1050A of the upstream side screw 1050. By making the width of the second region 1070 to be narrower than the first region 1060 like this, pressure can be efficiently applied to the connecting portion 1200 of the downstream side conveying portion 1100. As a result, the toner conveying efficiency from the upstream side conveying portion 1000 to the downstream side conveying portion 1100 can be improved. Furthermore, toner can be easily conveyed by the downstream side screw 1140 in the opposite direction of the gravity direction. According to the configuration of Embodiment 2, the height H1 of the first region 1060 can be decreased, hence the height of the upstream side conveying portion 1000 of the toner conveying apparatus 14 can be decreased.

Embodiment 3

Figure 6:
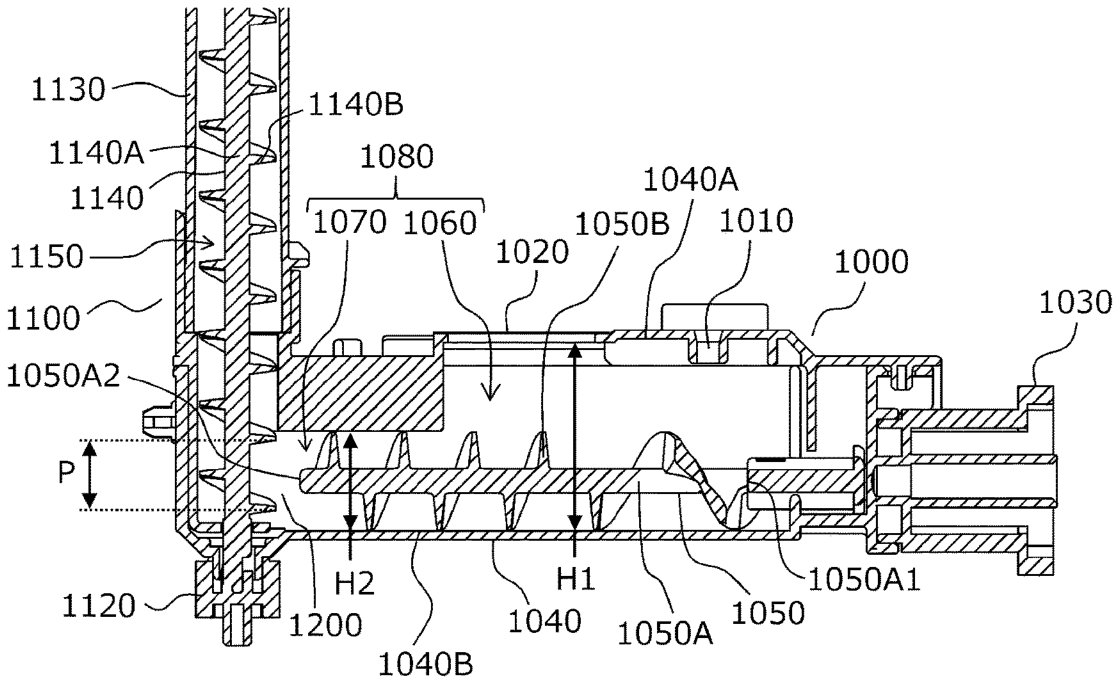
FIG. 6 is a cross-sectional view of a toner conveying apparatus according to Embodiment 3 of the present invention.

Embodiment 3 of the present invention will be described next. An element having a function or a configuration the same as or equivalent to Embodiment 1 is denoted with a same reference sign, and detailed description thereof is omitted. FIG. 6 is a diagram illustrating a detailed configuration of the connecting portion (connecting port) 1200 of the downstream side conveying portion 1100 that is connected to the upstream side conveying portion 1000 according to Embodiment 3.

The height H2 of the second region 1070 of the first conveying space 1080 is larger than the size of the pitch P of the blade portion 1140B of the downstream side screw 1140. The pitch P of the blade portion 1140B is a distance between two adjacent protruding portions of the blade portion 1050B when viewed in the direction perpendicular to the axial line direction of the rotation shaft 1140A of the downstream side screw 1140, for example. By making the height H2 of the second region 1070 of the first conveying space 1080 to be larger than the size of the pitch P of the blade portion 1140B of the downstream side screw 1140, more toner can be transferred to the downstream side screw 1140. Therefore pressure can be efficiently applied to the connecting portion 1200 of the downstream side conveying unit 1100. As a result, the toner conveying amount of the downstream side screw 1140 in the opposite direction of the gravity direction can be further increased.

In each embodiment, the downstream side conveying portion 1100 is disposed along the vertical direction, that is, the downstream side conveying portion 1100 is disposed such that the longitudinal direction thereof (axial line direction of the rotation shaft 1140A of the downstream side screw 1140) matches with the vertical direction, however the configuration of the toner conveying apparatus of the present invention is not limited to this. A configuration in which the longitudinal direction of the downstream side conveying portion 1100 is different from the vertical direction may be used. For example, the inclination angle of the longitudinal direction of the downstream side conveying portion 1100 with respect to the horizontal direction, or the longitudinal direction of the upstream side conveying portion 1000 (axial line direction of the rotation shaft 1050A of the upstream side screw 1050), may be at least 45 degrees and not more than 90 degrees.

The toner conveying apparatus of the present invention can be used not only for conveying new toner, as described in each embodiment, but also for conveying waste toner (e.g. untransferred toner). In this case, the particles to be conveyed may include not only waste toner but also such particles as paper dust generated from recording materials, but the major conveying target is still waste toner. Therefore the conveying efficiency of the particles can be improved by the configuration the same as each embodiment.

Embodiment 4

An image forming apparatus 1 according to Embodiment 4 of the present invention will be described with reference to FIG. 9. FIG. 9 is a schematic cross-sectional view illustrating a general configuration of the image forming apparatus 1, and is a cross-sectional view when the image forming apparatus 1 is viewed from the front side. FIG. 9 indicates a configuration of the image forming apparatus in a normal installation state where the image forming apparatus is disposed on a horizontal installation surface, and the left-right direction in FIG. 9 corresponds to the horizontal direction, and the up-down direction in FIG. 9 corresponds to the vertical direction of the apparatus.

The image forming apparatus 1 includes, as an image forming unit, an image forming portion 6 constituted of each image forming station 6Y, 6M, 6C and 6K which corresponds to the toner developer of each color: yellow (Y), magenta (M), cyan (C) and black (K) respectively, and is disposed horizontally in a line. Inside the image forming portion 6, each photosensitive drum, i.e., image bearing member, 7Y, 7M, 7C and 7K (hereafter photosensitive drum 7) and each charging apparatus 8Y, 8M, 8C and 8K (hereafter charging apparatus 8) which uniformly charges the surface of the photosensitive drum 7, are disposed. Further, inside the image forming portion 6, each developing apparatus 9Y, 9M, 9C and 9K (hereafter developing apparatus 9), which attaches toner to an electrostatic latent image formed on the photosensitive drum 7 and develops the image as a toner image (developer image), is disposed. Furthermore, inside the image forming portion 6, each photosensitive member cleaning blade 10Y, 10M, 10C and 10K (hereafter photosensitive member cleaning blade 10), which removes residual toner remaining on the photosensitive drum 7, is disposed. In the developing apparatus 9, each developing roller 11Y, 11M, 11C and 11K (hereafter developing roller 11) corresponding to each color is disposed such that contacting to and separating from each photosensitive drum 7 is possible. The developing roller 11 is contact or released in accordance with the electrostatic latent image, that is, in accordance with the requirements of development, so as to improve the product life of the developing roller 11. Moreover, a scanner unit 12, which emits a laser beam based on the image information and forms an electrostatic latent image on the photosensitive drum 7, is disposed under the image forming portion 6. Each image forming station 6Y, 6M, 6C and 6K is configured as a process cartridge, so as to be detachable from the apparatus main body of the image forming apparatus 1. The process cartridge is configured to attach/detach the developing apparatus 9 equipped with the developing roller 11 and the photosensitive unit equipped with the photosensitive drum 7, the charging apparatus 8 and the photosensitive member cleaning blade 10, to/from the apparatus main body individually or integreatedly. In Embodiment 4, the developing apparatus 9 includes its own toner containing chamber, so that toner supplied from a replenishing toner container (toner cartridge) 13 is replenished to the toner containing chamber. Here the apparatus main body of the image forming apparatus 1 is referred to as the image forming apparatus 1, excluding the configuration portion is detachable from the image forming apparatus 1, such as the above mentioned process cartridge and the replenishing toner container 13.

In a lower part of the image forming apparatus 1, a drawer-shaped cassette 2 is housed. In the cassette 2, recording material 4, such as papers and sheets, is stored. The recording material 4 is separated and fed one-by-one by rotation of a paper feeding cassette portion 3 which is disposed near the front end of the recording material 4. Then each sheet of the recording material 4 is conveyed downstream by a resist roller 5.

An intermediate transfer unit 16 is disposed above the developing apparatus 9. The intermediate transfer unit 16 is disposed in an approximately horizontal position, so that the lower part thereof is the side facing each image forming station (image forming portion) 6 (on the side of the primary transfer portion 20). An intermediate transfer belt 18 which faces each photosensitive drum 7 is a rotatable endless belt, and is stretched by a plurality of stretching rollers. Each primary transfer roller 19Y, 19M, 19C and 19K (hereafter primary transfer roller 19) is disposed on the inner surface side of the intermediate transfer belt 18 as a primary transfer member. Each primary transfer roller 19 is disposed at a position so as to form each primary transfer portion 20Y, 20M, 20C and 20K (hereafter primary transfer portion 20) with each photosensitive drum 7 respectively via the intermediate transfer belt 18. A toner image is transferred from each photosensitive drum 7 to the intermediate transfer belt 18 in each primary transfer portion 20 by the primary transfer roller 19 to which voltage is applied. In Embodiment 4, a unit constituted of the intermediate transfer belt 18, a plurality of stretching rollers to stretch the intermediate transfer belt 18, and each primary transfer roller 19 can be detachable from the apparatus main body as an intermediate transfer unit 16.

The toner image developed by each image forming station is transferred to the intermediate transfer belt 18 by the primary transfer portion 20, and by sequentially transferring each color, a four-color toner image is formed on the surface of the intermediate transfer belt 18, and is conveyed to a secondary transfer portion 17.

In a lower part of the image forming portion 6, each replenishing toner container 13Y, 13M, 13C and 13K (hereafter replenishing toner container 13), which replenishes toner to each image forming station (image forming portion) 6, is detachably disposed approximately horizontally between the scanner unit 12 and the cassette 2. The replenishing toner container 13 is also called a toner replenishing cartridge. Replenishing toner corresponding to each color is filled in the replenishing toner container 13. Each toner conveying apparatus 14Y, 14M, 14C and 14K (hereafter toner conveying apparatus 14) conveys toner, received from the replenishing toner container 13 upward in accordance with the consumption of the toner inside the image forming portion 6, and supplies the toner to the developing apparatus 9. The toner conveying apparatus 14 is driven by each toner conveying driving apparatus 15Y, 15M, 15C and 15K (hereafter toner conveying driving apparatus 15), which is a driving unit disposed below the toner conveying apparatus 14.

A secondary transfer roller 21, which is a secondary transfer member, contacts the intermediate transfer belt 18 so as to form the secondary transfer portion 17 with a roller on the opposite side via the intermediate transfer belt 18. The toner image transferred onto the intermediate transfer belt 18 by the secondary transfer portion 17 is secondarily transferred to the recording material 4. The recording material 4, onto which the unfixed toner image is transferred, is further conveyed to the downstream side, and is pressed and heated by a fixing apparatus 25, and the toner image is fixed to the recording material 4 by the melted toner. Then the recording material 4 is discharged into a paper delivery tray 27. By this series of operations, an image is formed on the surface of the recording material 4.

In the image forming apparatus 1, a toner collecting container (containing portion) 24, to collect waste toner discharged in the primary transfer and secondary transfer, is disposed. Since the image forming apparatus 1 is an electrophotographic system, transfer is performed by electrostatic force in the primary transfer and the secondary transfer. Therefore the entire toner image of the transfer source is not transferred, and several percent of the toner image remains on the surface of the photosensitive drum 7 and on the surface of the intermediate transfer belt 18 of the transfer source. The residual toner which was not transferred is cleaned off to improve the stability of image forming. The residual toner that is cleaned off becomes waste toner, and is collected in the toner collecting container 24.

A waste toner conveying apparatus (toner conveying apparatus), which is a toner conveying portion, includes each waste toner conveying passage 51Y, 51M, 51C and 51K (hereafter waste toner conveying passage 51) and waste toner conveying passages 52, 53 and 54. Further, the waste toner conveying apparatus includes a driving apparatus (drive portion) that rotates a screw to convey wastes toner in each waste toner conveying passage 51, 52, 53, and 54.

A waste toner (residual toner) conveying operation, from the primary transfer portion 20 and the secondary transfer portion 17 to the toner collecting container 24, will be described.

The toner that remained after the primary transfer (residual toner on the surface of the photosensitive drum 7) is collected by the photosensitive member cleaning blade 10, is conveyed in the sequence of the waste toner conveying passages 51, 52, 53 and 54, and is stored in the toner collecting container 24. The toner that remained in the secondary transfer portion 17 (residual toner on the surface of the intermediate transfer belt 18) is collected by the cleaning unit 22. Then the residual toner collected by the cleaning unit 22 is conveyed from the water toner conveying passage 55 to the waste toner conveying passage 53, is merged with the residual toner collected by the photosensitive member cleaning blade 10, and is stored in the toner collecting container 24 as waste toner. The waste toner conveying apparatus is included in the image forming apparatus 1, and is used by the image forming apparatus 1. The waste toner conveying passages 51, 52, 53 and 54 may be detachable from the image forming apparatus 1.

Figure 8A:
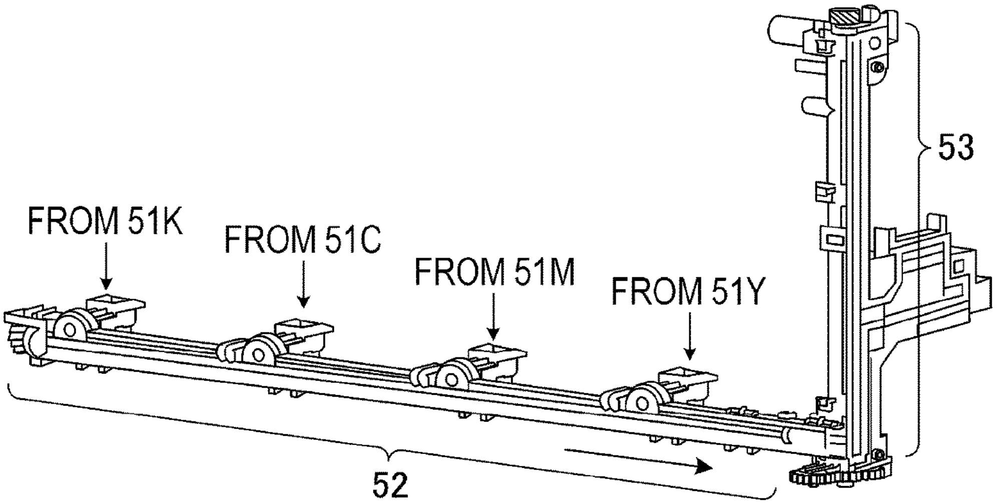
FIG. 8A and FIG. 8B are perspective views of the toner conveying apparatus according to Embodiment 4 of the present invention.
Figure 8B:
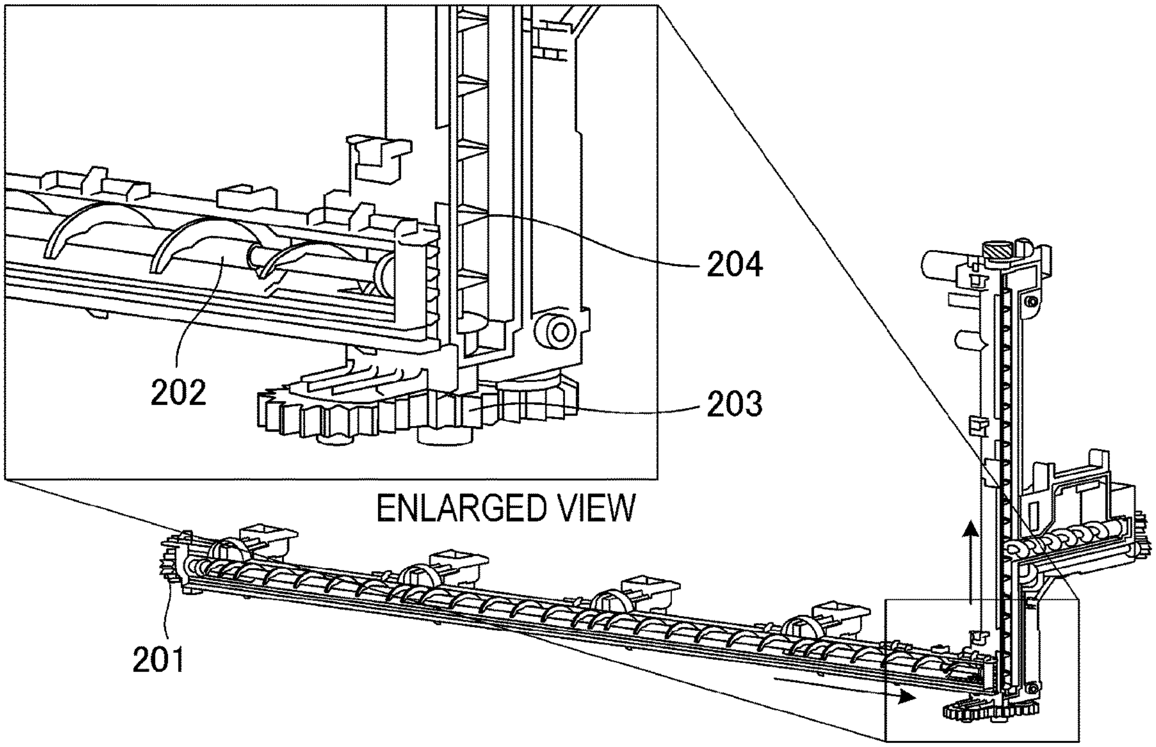

FIG. 8A indicates a detailed configuration of the waste toner conveying passages 52 and 53 included in the image forming apparatus 1, and FIG. 8B indicates a detailed internal configuration. The waste toner of each color flows from the waste toner conveying passage 51 into the waste toner conveying passage 52. The waste toner conveying passage 52 includes a rotatable screw 202 (first screw) that conveys the waste toner (particles). The waste toner that flows into the waste toner conveying passage 52 is conveyed to the downstream side of the waste toner conveying passage 51 by rotation of the screw 202. The screw 202 is rotary-driven by the rotary-driving force which is transferred from the driving apparatus (first drive portion) to the driving gear 201.

The waste toner conveying passage 53 is connected to the waste toner conveying passage 52. The waste toner conveying passage 53 includes a rotatable downstream side screw 204 (second screw) that conveys the waste toner. The waste toner conveyed to the downstream of the waste toner conveying passage 52 flows into the waste toner conveying passage 53. The waste toner that flows into the waste toner conveying passage 53 is conveyed upward in the vertical direction by rotation of the downstream side screw 204. The downstream side screw 204 is rotary-driven by the rotary-driving force which is transferred from the driving apparatus (second drive portion) to the driving gear 203.

Figure 7:
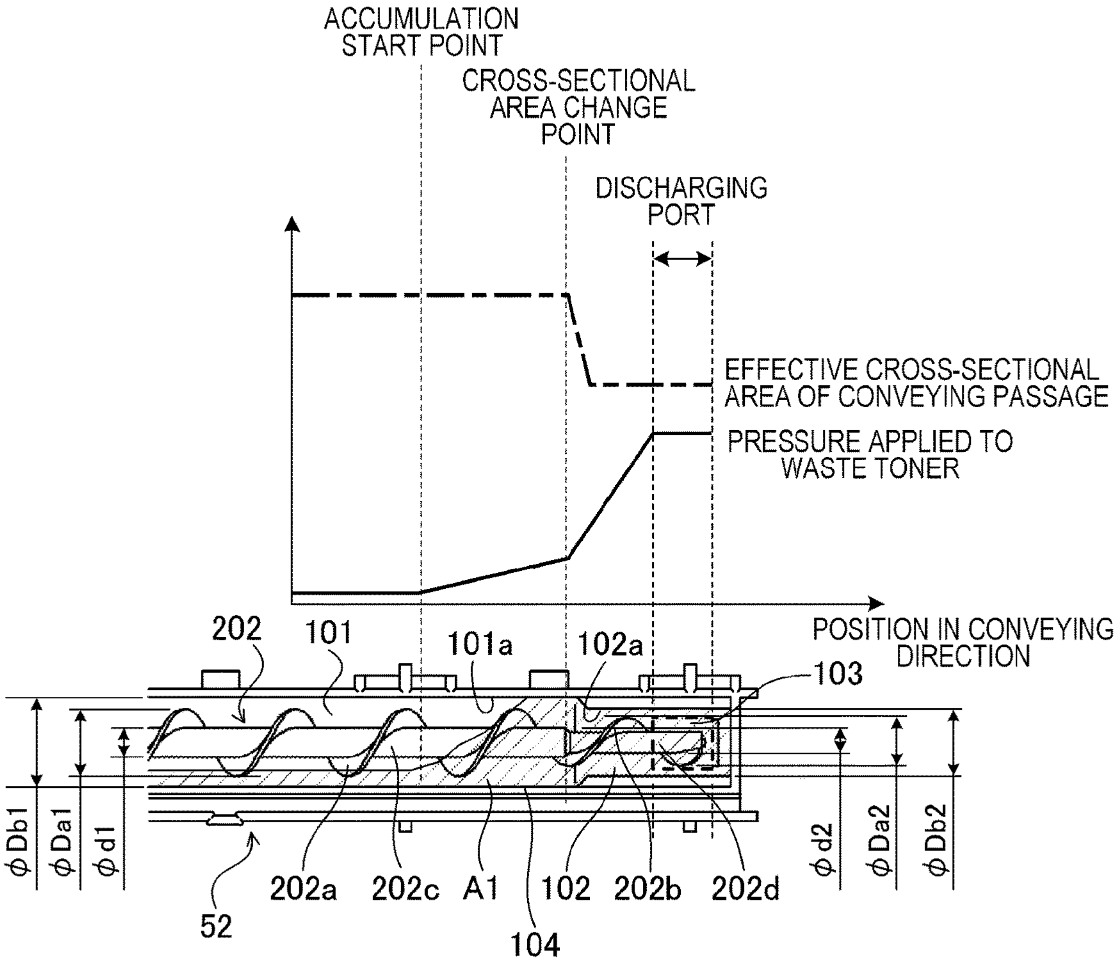
FIG. 7 is an explanatory drawing of a toner conveying apparatus according to Embodiment 4 of the present invention.

Screw configuration that is characteristic to Embodiment 4 and the effects thereof will be described next. FIG. 7 is an explanatory drawing of the toner conveying apparatus, where the downstream side internal configuration of the waste toner conveying passage 52, included in the toner conveying apparatus, is illustrated. A screw 202, which is a conveying member, includes a rotation shaft and is rotatable. The screw 202 includes a large diameter screw portion 202*a*, a small diameter screw portion 202*b*, a rotation shaft portion 202*c* (large diameter shaft portion), and a rotation shaft portion 202*d* (small diameter shaft portion). The large diameter screw portion 202*a* is disposed helically around the outer periphery of the rotation shaft portion 202*c*, and the small diameter screw portion 202*b* is disposed helically around the outer periphery of the rotation shaft portion 202*d*. The large diameter screw portion 202*a* and the small diameter screw portion 202*b* are blade portions that are blade-shaped.

The screw 202 includes a first screw portion constituted of the large diameter screw portion 202*a* and the rotation shaft portion 202*c*, and a second screw portion constituted of the small diameter screw portion 202*b* and the rotation shaft portion 202*d*. The first screw portion of the screw 202 is disposed on the upstream side of the waste toner conveying passage 52. The second screw portion of the screw 202 is disposed on the downstream side of the waste toner conveying passage 52. The first screw portion (large diameter screw portion 202*a* and the rotation shaft portion 202*c*) of the screw 202 is disposed on the upstream side in the waste toner conveying direction (upstream side of the waste toner conveying passage 52) with respect to a point where the cross-sectional area of the waste toner conveying passage 52 changes (cross-sectional area change point). The waste toner conveying direction on the waste toner conveying passage 52 is the rotation shaft direction of the screw 202, and is a direction toward a connecting portion between the waste toner conveying passage 52 and the waste toner conveying passage 53. The waste toner conveying passage 52 is disposed in the image forming apparatus 1 so that the rotation shaft direction of the screw 202 matches with the horizontal direction.

The outer diameter (screw outer diameter) of the large diameter screw portion 202*a* is ϕDa1. Therefore the outer diameter (diameter) of the first screw portion constituted of the large diameter screw portion 202*a* and the rotation shaft portion 202*c* is ϕDa1. ½ of the outer diameter of the large diameter screw portion 202*a* ϕDa1) is a distance from the rotation center line (rotation axial line) of the rotation shaft portion 202*c* to the outer periphery edge of the large diameter screw portion 202*a*. The second screw portion (small diameter screw portion 202*b* and the rotation shaft portion 202*d*) of the screw 202 is disposed on the downstream side of the waste toner conveying direction (downstream side of the waste toner conveying passage 52) with respect to the cross-sectional area change point. The outer diameter of the small diameter screw portion 202*b* is ϕDa2. Therefore the outer diameter of the second screw portion constituted of the small diameter screw portion 202*b* and the rotation shaft portion 202*d* is ϕDa2. ½ of the outer diameter of the small diameter screw portion 202*b* ϕDa2) is a distance from the rotation center line of the rotation shaft portion 202*d* to the outer periphery edge of the small diameter screw portion 202*b*. The large diameter screw portion 202*a* and the small diameter screw portion 202*b* are formed so that the outer diameter of the small diameter screw portion 202*b* ϕDa2) is smaller than the outer diameter of the large diameter screw portion 202*a* @Da1) @Da1>ϕDa2).

An outer diameter of the rotation shaft portion 202*c* of the large diameter screw portion 202*a* is ϕd1. An outer diameter of the rotation shaft portion 202*d* of the small diameter screw portion 202*b* is ϕd2. The rotation shaft portion 202*c* and the rotation shaft portion 202*d* are formed so that the outer diameter of the rotation shaft portion 202*d* of the small diameter screw portion 202*b* (ϕd2) is smaller than the outer diameter of the rotation shaft portion 202*c* of the large diameter screw portion 202*a* (ϕd1) (ϕd1>ϕd2).

A pipe portion 101 (first pipe) of which inner diameter is ϕDb1 and a pipe portion 102 (second pipe) of which inner diameter is ϕDb2 are disposed around the screw 202 in accordance with the outer diameter of the screw 202. The pipe portion 101 is disposed on the upstream side of the waste toner conveying passage 52. The pipe portion 102 is disposed on the downstream side of the waste toner conveying passage 52. The pipe portion 101 and the pipe portion 102 are formed so that the inner diameter of the pipe portion 102 (ϕDb2) is smaller than the inner diameter of the pipe portion 101 (ϕDb1). The pipe portion 101 and the pipe portion 102 constitute a pipe 104 into which the waste toner flows. The pipe 104 is disposed on the waste toner conveying passage 52. A screw 202 is disposed inside the pipe (inside the pipe 104). A hole 103, which is a discharging port (opening), is formed at the edge of the pipe portion 102, and the hole 103 is disposed on the downstream side of the waste toner conveying passage 52.

The screw 202 extends to the vicinity of the hole 103 of the pipe portion 102. In other words, the second screw portion of the screw 202 is disposed in the vicinity of the hole 103 of the pipe portion 102. In FIG. 7, the vicinity of the hole 103 of the pipe portion 102 includes a region overlapping with the hole 103 and a peripheral region of the region overlapping with the hole 103 when viewed in the direction perpendicular to the rotation shaft direction of the screw 202. In FIG. 7, the hole 103 is disposed in the pipe portion 102 so as to face the direction perpendicular to the rotation shaft direction of the screw 202. The screw 202 extends to the vicinity of the hole 103 so that a part of the screw 202 (second screw portion) and a part of the hole 103 overlap when viewed in the direction perpendicular to the rotation shaft direction of the screw 202. The screw configuration is not limited to the configuration in FIG. 7, and the screw 202 and the hole 103 may not overlap when viewed in the direction perpendicular to the rotation shaft direction of the screw 202. Further, the hole 103 may be disposed in the pipe portion 102 so as to face the rotation shaft direction of the screw 202. In this case, the screw 202 extends to the vicinity of the hole 103 so that a part of the screw 202 (second screw portion) and a part of the hole 103 overlap when viewed in the rotation shaft direction of the screw 202. The screw configuration is not limited to this configuration either, and the screw 202 and the hole 103 may not overlap when viewed in the rotation shaft direction of the screw 202.

The waste toner conveyed to the waste toner conveying passage 52 is pushed out to the waste toner conveying passage 53 side through the hole 103 of the pipe portion 102. In other words, by the rotation of the screw 202, the waste toner inside the pipe portion 101 flows into the pipe portion 102, and the waste toner is discharged from the hole 103 of the pipe portion 102. This means that the hole 103 is a discharging port to discharge the waste toner inside the pipe portion 102. When the waste toner is conveyed into the waste toner conveying passage 52, the waste toner is distributed in the region A1 indicated by diagonal hatching in FIG. 7 in the waste toner conveying passage 52, and the region (vicinity region) on the side close to the hole 103 (periphery side) in the waste toner conveying passage 52 is filled with the waste toner.

In a conventional configuration, as in the case of the arrangement illustrated in FIG. 9 of Japanese Patent Application Publication No. 2014-157350, even if a space is created above the screw in the cross-section in the shaft direction of the screw disposed horizontally, the toner does not enter the space, and is conveyed in the shaft direction of the screw. In this case, the conveying force applied to the toner when the toner is transferred from the upstream side screw to the downstream side screw is the totality of the conveying force in the radial direction generated by the screw and gravity.

Therefore in the case of (1) a configuration in which the downstream side screw is located above the upstream side screw in the vertical direction, and (2) a configuration in which the conveying passage is inclined so that the edge of the downstream side screw becomes higher as the downstream of the conveying passage is approached, toner may not be smoothly conveyed since the conveying force of the screw in the radial direction alone is insufficient.

In the case of the above configurations (1) and (2), the conveying efficiency drops because of the transfer portion between the upstream side screw and the downstream side screw. This results in a drop in the maximum conveying force of the entire system with respect to the maximum conveying force of each screw.

Therefore in a conventional image forming apparatus, the toner amount required by a process cartridge is set, and in order to satisfy this toner amount that is set, the rotation speed of the screw is increased so that the toner conveying amount becomes sufficient.

However, although the required toner conveying amount is satisfied, the operating sound increases as the rotation speed of the screws increases. Further, the product life of the apparatus decreases, since the cumulative rotation speed of the screws in the particle conveying apparatus increases during a product life cycle of the image forming apparatus.

Moreover, if the rotation speed of the screws is increased, damage to the toner is increased due to pressure and rubbing that the toner is subject to during conveying, and the toner may melt, and in the worst case the melt toner may interrupt the rotation of the screws and cause the conveying passage to clog.

In Embodiment 4, on the other hand, the waste toner conveying passage 53 (second conveying passage) is connected to the hole 103 of the pipe portion 102. In other words, the waste toner flows into the waste toner conveying passage 53 via the hole 103. The hole 103 may be regarded as a connecting port that connects the waste toner conveying passage 52 and the waste toner conveying passage 53. Thereby when the waste toner that flows into the waste toner conveying passage 53 is conveyed upward in the vertical direction, the vicinity of the hole 103 in the waste toner conveying passage 52 is in a state of being filled with waste toner. The graph in FIG. 7 indicates the effective cross-sectional area of the conveying passage and the pressure applied to the waste toner in this state when the abscissa indicates the position of the waste toner in the conveying direction.

Now an effective cross-sectional area of the conveying passage will be described. The effective cross-sectional area of the pipe portion 101 is a surface area determined by subtracting the cross-sectional area of the rotation shaft portion 202*c* of the screw 202 in the direction perpendicular to the rotation shaft direction of the screw 202 (hereafter perpendicular direction) from the cross-sectional area of the pipe portion 101 in the perpendicular direction. In other words, the effective cross-sectional area of the pipe portion 101 is a cross-sectional area in the perpendicular direction of a space created between the inner wall 101*a* of the pipe portion 101 and the rotation shaft portion 202*c* of the screw 202. The effective cross-sectional area of the pipe portion 102 is a surface area determined by subtracting the cross-sectional area of the rotation shaft portion 202*d* of the screw 202 in the perpendicular direction from the cross-sectional area of the pipe portion 102 in the perpendicular direction. In other words, the effective cross-sectional area of the pipe portion 102 is a cross-sectional area in the perpendicular direction of a space created between the inner wall 102*a* of the pipe portion 102 and the rotation shaft portion 202*d* of the screw 202. The effective cross-sectional area of the waste toner conveying passage 52 is an effective cross-sectional area of the pipe portion 101, or an effective cross-sectional area of the pipe portion 102. The effective cross-sectional area of the waste toner conveying passage 52 is the same as the cross-sectional area of a region of the waste toner conveying passage 52 where the waste toner passes through.

In Embodiment 4, the outer diameter of the screw 202 is changed so that the effective cross-sectional area of the waste toner conveying passage 52 on the downstream side of the cross-sectional area change point (downstream side effective cross-sectional area) is different from the effective cross-sectional area of the waste toner conveying passage 52 on the upstream side of the cross-sectional area change point (upstream side effective cross-sectional area). In other words, the effective cross-sectional area of the waste toner conveying passage 52 is set so that the downstream side effective cross-sectional area is smaller than the upstream side sectional area. For example, the effective cross-sectional area of the vicinity of the hole 103 (effective cross-sectional area of the pipe portion 102) in the waste toner conveying passage 52 is smaller than the effective cross-sectional area of the waste toner conveying passage 52 other than the vicinity of the hole 103 (effective cross-sectional area of the pipe portion 101) in the waste toner conveying passage 52.

The pressure that is applied to the waste toner gradually increases from the accumulation start point toward the downstream side. That is, the waste toner amount per sectional area of the waste toner conveying passage 52 starts to increase from the accumulation start point. The cross-sectional area of the waste toner conveying passage 52 decreases from the cross-sectional area change point toward the downstream side of the waste toner conveying passage 52. Therefore the inclination of the rising of the pressure applied to the waste toner starts to increase from the cross-sectional area change point, and the pressure that is applied to the waste toner finally reaches the maximum at the discharging point (hole 103) of the waste toner conveying passage 52. Since the pressure that is applied to the waste toner becomes the maximum value at the discharging port of the waste toner conveying passage 52, the pressure, required for the waste toner conveying passage 53 to convey the waste toner upward in the vertical direction, can be guaranteed. Thereby each time the waste toner is supplied to the waste toner conveying passage 52, the waste toner can flow from the waste toner conveying passage 52 to the waste toner conveying passage 53.

In a conventional conveying configuration that does not have a cross-sectional area change point, the slope of the increase in the pressure that is applied to the waste toner, from the accumulation start point to the discharging port of the conveying passage, is gentle. Therefore the accumulation start point in the conventional configuration is on the more upstream side of the waste toner conveying passage 52, compared with the configuration of Embodiment 4. By decreasing the effective cross-sectional area of the waste toner conveying passage 52 toward the downstream side of the waste toner conveying passage 52 as in the configuration of Embodiment 4, the waste toner amount accumulated in the area between the accumulation start point and the discharging port of the waste toner conveying passage 52 can be relatively decreased.

When waste toner is pressed, it may melt or stick together, causing the toner to clog the conveying passage. According to the configuration of Embodiment 4, the risk of toner clogging the waste toner conveying passage 52 can be reduced by decreasing the waste toner amount that accumulates in the waste toner conveying passage 52. Furthermore, the flow speed of the waste toner from the accumulation start point to the discharging port of the waste toner conveying passage 52 increases by decreasing the effective cross-sectional area of the waste toner conveying passage 52 in the downstream side of the waste toner conveying passage 52. Hence as the time required to move the waste toner inside the waste toner conveying passage 52 decreases, the time when pressure is applied to the waste toner inside the waste toner conveying passage 52 also decreases. As a result, the melting of the waste toner and waste toners sticking together can be prevented.

In Embodiment 4, the length from the cross-sectional area change point to the discharging port (hole 103) of the waste toner conveying passage 52 is the same as one rotation pitch of the helical shape of the small diameter screw portion 202*b*. The effective cross-sectional area of the region from the cross-sectional area change point to the discharging port (hole 103) of the waste toner conveying passage 52 (effective cross-sectional area of the pipe portion 102) is smaller than the effective cross-sectional area from the cross-sectional area change point to the upstream side edge of the waste toner conveying passage 52 (effective cross-sectional area of the pipe portion 101). In the region from the cross-sectional area change point to the discharging port (hole 103) of the waste toner conveying passage 52, the small diameter screw portion 202*b* cycles at least once around the rotation shaft portion 202*d*. Thereby generating the flow in the opposite direction of the conveying direction of the waste toner in the waste toner conveying passage 52 is prevented, and the waste toner can be efficiently conveyed to the downstream side of the waste toner conveying passage 52. As a result, the waste toner can be efficiently discharged from the discharging port (hole 103) of the waste toner conveying passage 52.

According to Embodiment 4, in the case where the waste toner is conveyed upward in the vertical direction, the required inflow pressure to the waste toner conveying passage 53 can be efficiently generated. Therefore the toner conveying efficiency on the downstream side of the toner conveying passage can be improved. Further, the toner conveying efficiency in the toner conveying passage, where the downstream side is influenced more by gravity than the upstream side, can be improved. Therefore an increase in the operating sound and a decrease in the product life of the apparatus, caused by increasing the rotation speed of screws, can be prevented. Furthermore, by setting the accumulation start point closer to the discharging port (hole 103) of the waste toner conveying passage 52, the region where pressure is applied to the waste toner is reduced, and time when the waste toner passes through the waste toner conveying passage 52 is decreased. Thereby damage to waste toner can be reduced.

In the configuration of Embodiment 4, the waste toner conveying passage 53 is disposed along the vertical direction, that is, the longitudinal direction of the waste toner conveying passage 53 (rotation shaft direction of the downstream side screw 204) matches with the vertical direction, but the present invention is not limited to this configuration. A configuration where the longitudinal direction of the waste toner conveying passage 53 is different from the vertical direction may be used. Then a similar effect can be acquired regardless the inclination angle of the longitudinal direction of the waste toner conveying passage 53 with respect to the vertical direction. Moreover, a similar effect can be acquired regardless the angle of the longitudinal direction of the waste toner conveying passage 52 (rotation shaft direction of the screw 202) with respect to the longitudinal direction of the waste toner conveying passage 53.

The present invention is not limited to conveying waste toner, but a similar effect can be acquired in a configuration to convey such particles as toner before development. For example, for the toner conveying apparatus 14, a toner conveying passage having a similar configuration to the waste toner conveying passage 52 and a toner conveying passage having a similar configuration to the waste toner conveying passage 53 may be disposed. Furthermore, in Embodiment 4, one parameter of the outer diameter of the screw 202 or the like is set for the part before the cross-sectional area change point and the part after the cross-sectional area change point respectively. However, a parameter of the outer diameter of the screw 202 or the like may be changed continuously, since this effect can be acquired by providing at least a one step of the change in the outer diameter of the screw 202.

Embodiment 5

Figure 10:
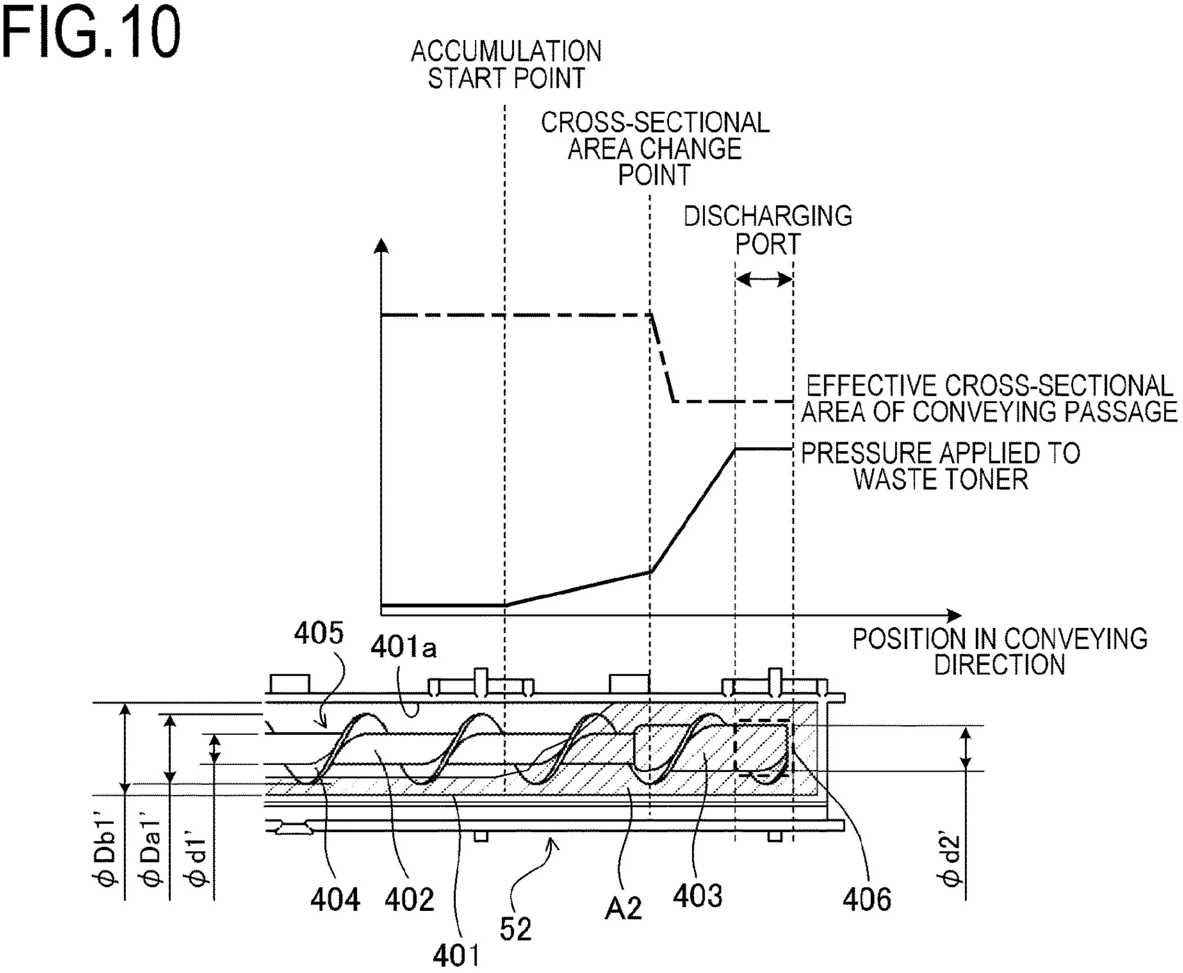
FIG. 10 is an explanatory drawing of a toner conveying apparatus according to Embodiment 5 of the present invention.

Embodiment 5 of the present invention will be described next. An element having a function or a configuration the same as or equivalent to Embodiment 4 is denoted with a same reference sign, and detailed description thereof is omitted. FIG. 10 is an explanatory drawing of the toner conveying apparatus, where the downstream side internal configuration of the waste toner conveying passage 52 of the toner conveying apparatus is illustrated. A pipe 401 is disposed in the waste toner conveying passage 52. A screw 405 is disposed in the pipe (inside the pipe 401). The screw 405 (conveying member) has a rotation shaft and is rotatable. The screw 405 includes a rotation shaft portion 402 (small diameter shaft portion), a rotation shaft portion 403 (large diameter shaft portion), and a screw portion 404. The screw portion 404 is disposed helically around the outer periphery of the rotation shaft portions 402 and 403. The screw portion 404 is a blade portion that is blade-shaped.

The screw 405 includes a first screw portion constituted of the screw portion 404 and the rotation shaft portion 402, and a second screw portion constituted of the screw portion 404 and the rotation shaft portion 403. The first screw portion (screw portion 404 and rotation shaft portion 402) of the screw 405 is disposed on the upstream side of the point at which the cross-sectional area of the waste toner conveying passage 52 changes (cross-sectional area change point) in the waste toner conveying direction (upstream side of the waste toner conveying passage 52). The second screw portion (screw portion 404 and rotation shaft portion 403) of the screw 405 is disposed on the downstream side of the cross-sectional area change point in the waste toner conveying direction (downstream side of the waste toner conveying passage 52).

The outer diameter (screw outer diameter) of the screw portion 404 is ϕDa1' Therefore the outer diameter (diameter) of the screw 405 is ϕDa1'. Furthermore, the outer diameter of the first screw portion of the screw 405 and the outer diameter of the second screw portion of the screw 405 are both ϕDa1'. ½ of the outer diameter of the first screw portion of the screw 405 ϕDa1') is a distance from the rotation center line of the rotation shaft portion 402 to the outer periphery edge of the screw portion 404. ½ of the outer diameter of the second screw of the portion of the screw 405 ϕDa1') is the distance from the rotation center line of the rotation shaft portion 403 to the outer periphery edge of the screw portion 404. The rotation shaft portion 402 and the rotation shaft portion 403 are formed so that the outer diameter of the rotation shaft portion 403 ϕd2') is larger than the outer diameter of the rotation shaft portion 402 (ϕd1') ϕd1'<ϕd2').

Around the screw 405, a pipe 401 (pipe portion) of which inner diameter is ϕDb1' is disposed in accordance with the outer diameter of the screw 405. A hole 406, which is a discharging port (opening), is formed at the edge of the pipe 401, and the hole 406 is disposed on the downstream side of the waste toner conveying passage 52.

The screw 405 extends to the vicinity of the hole 406 of the pipe 401. In other words, the second screw portion of the screw 405 is disposed in the vicinity of the hole 406 of the pipe 401. In FIG. 10, the vicinity of the hole 406 of the pipe 401 includes: a region overlapping with the hole 406; and a peripheral region of the region overlapping with the hole 406, when viewed in the direction perpendicular to the rotation shaft direction of the screw 405. In FIG. 10, the hole 406 is disposed in the pipe 401 so as to face the direction perpendicular to the rotation shaft direction of the screw 405. The screw 405 extends to the vicinity of the hole 406 so that a part of the screw 405 (second screw portion) and a part of the hole 406 overlap when viewed in the direction perpendicular to the rotation shaft direction of the screw 405. The screw configuration is not limited to the configuration in FIG. 10, and the screw 405 and the hole 406 may not overlap when viewed in the direction perpendicular to the rotation shaft direction of the screw 405. Further, the hole 406 may be disposed in the pipe 401 so as to face the rotation shaft direction of the screw 405. In this case, the screw 405 extends to the vicinity of the hole 406 so that a part of the screw 405 (second screw portion) and a part of the hole 406 overlap when viewed in the rotation shaft direction of the screw 405. The screw configuration is not limited to this configuration either, and the screw 405 and the hole 406 may not overlap when viewed in the rotation shaft direction of the screw 405.

The waste toner conveyed to the waste toner conveying passage 52 is pushed out to the waste toner conveying passage 53 side through the hole 406 of the pipe 401. In other words, by the rotation of the screw 405, the waste toner is discharged from the hole 406 of the pipe 401. This means that the hole 406 is a discharging port to discharge the waste toner inside the pipe 401. When the waste toner is conveyed into the waste toner conveying passage 52, the waste toner is distributed in the region A2 indicated by diagonal hatching in FIG. 10 in the waste toner conveying passage 52, and the region (vicinity region) on the side close to the hole 406 (periphery side) in the waste toner conveying passage 52 is filled with the waste toner.

The waste toner conveying passage 53 (second conveying passage) is connected to the hole 406 of the pipe 401. The waste toner flows into the waste toner conveying passage 53 via the hole 406. The hole 406 may be regarded as a connecting port that connects the waste toner conveying passage 52 and the waste toner conveying passage 53. Thereby when the waste toner that flows into the waste toner conveying passage 53 is conveyed upward in the vertical direction, the vicinity of the hole 406 in the waste toner conveying passage 52 is in a state of being filled with the waste toner. The graph in FIG. 10 indicates the effective cross-sectional area of the conveying passage and the pressure applied to the waste toner in this state when the abscissa indicates the position of the waste toner in the conveying direction.

Now an effective cross-sectional area of the conveying passage will be described. The effective cross-sectional area of the region of the pipe 401, where the first screw portion of the screw 405 is disposed, is a surface area determined by subtracting the cross-sectional area of the rotation shaft portion 402 in the direction perpendicular to the rotation shaft direction of the screw 405 (hereafter perpendicular direction) from the cross-sectional area of the pipe 401 in the perpendicular direction. In other words, the effective cross-sectional area of the region of the pipe 401, where the first screw portion of the screw 405 is disposed (effective cross-sectional area of the first portion of the pipe 401), is a cross-sectional area in the perpendicular direction of a space created between an inner wall 401*a* of the pipe 401 and the rotation shaft portion 402 of the screw 405. The effective cross-sectional area of the region of the pipe 401, where the second screw portion of the screw 405 is disposed, is a surface area determined by subtracting the cross-sectional area of the rotation shaft portion 403 in the direction perpendicular to the rotation shaft direction of the screw 405 (hereafter perpendicular direction) from the cross-sectional area of the pipe 401 in the perpendicular direction. In other words, the effective cross-sectional area of the region of the pipe 401, where the second screw portion of the screw 405 is disposed, (effective cross-sectional area of the second portion of the pipe 401), is a cross-sectional area in the perpendicular direction of a space created between the inner wall 401*a* of the pipe 401 and the rotation shaft portion 403 of the screw 405. The effective cross-sectional area of the waste toner conveying passage 52 is the effective cross-sectional area of the first portion of the pipe 401, or the effective cross-sectional area of the second portion of the pipe 401.

In Embodiment 5, the rotation shaft diameter of the screw 405 is increased without changing the outer diameter of the screw 405 (ϕDa1'). Similarly to Embodiment 4, as indicated in the graph in FIG. 10 depicting the effective cross-sectional area of the conveying passage, the effective surface area of the conveying passage on the downstream side in the waste toner conveying direction, with respect to the cross-sectional area change point, can be decreased compared with the effective cross-sectional area of the conveying passage on the upstream side in the waste toner conveying direction. For example, the effective cross-sectional area of the vicinity of the hole 406 in the waste toner conveying passage 52 (effective cross-sectional area of the second portion of the pipe 401) is smaller than the effective cross-sectional area of a region other than the vicinity of the hole 406 in the waste toner conveying passage 52 (effective cross-sectional area of the first portion of the pipe 401). Therefore the pressure that is applied to the waste toner increases by the same mechanism described in Embodiment 4, and just like Embodiment 4, the required inflow pressure to the waste toner conveying passage 53 can be efficiently generated when the waste toner is conveyed upward in the vertical direction. Hence the toner conveying efficiency on the downstream side of the toner conveying passage can be improved. Further, the toner conveying efficiency in the toner conveying passage, where the downstream side is influenced more by gravity than the upstream side, can be improved. Furthermore, by setting the accumulation start point closer to the discharging port (hole 406) of the waste toner conveying passage 52, the region where pressure is applied to the waste toner is reduced, and time when the waste toner passes through the waste toner conveying passage 52 is decreased. Thereby damage to the waste toner can be reduced.

In Embodiment 5, in terms of the mechanism, the same effect as Embodiment 4 can be expected by using the same effective cross-sectional area of the conveying passage. However, in the case of adjusting the shapes of the screws and components on the outer periphery of the screws, in accordance with the flow amount and conditions of the waste toner, it is sufficient to change the screws in Embodiment 5. Therefore, such a case, the configuration of Embodiment 5 is preferable. In Embodiment 5, the outer diameter of the screw is constant, but the effective cross-sectional area of the conveying passage may be adjusted (combining Embodiments 4 and 5), and a similar effect can be acquired even with this configuration. Further, just like Embodiment 4, the present invention is not limited to conveying the waste toner, but a similar effect can be acquired even in the case of conveying such particles as toner before development.

Embodiment 6

A conventional electrophotographic type image forming apparatus, such as a printer, a copier and a facsimile, is constituted of three components: a toner containing portion that stores toner in advance; a toner conveying unit that conveys toner; and an image forming portion that is disposed at the downstream side of the toner conveying unit.

A configuration that is conventionally used to convey the toner is disposing a screw, which has a rotation shaft at the center and includes a blade portion helically extending from the outer periphery of the screw, in the conveying passage, and conveying the toner from upstream to downstream of the conveying passage by rotating the screw.

Japanese Patent Application Publication No. 2014-157350 discloses a configuration for dropping and conveying toner from a toner supply port of a toner bottle, which is disposed on the upper side in the vertical direction, to a developing apparatus via a toner conveying passage. In this case, the toner conveying passage is constituted of a plurality of screws which are interconnected, and toner is conveyed to a desired toner supply port by changing the conveying direction and height of the screws, as illustrated in FIG. 9 and FIG. 10 of Japanese Patent Application Publication No. 2014-157350.

For example, in the case of the configuration illustrated in FIG. 10 of Japanese Patent Application Publication No. 2014-157350, two screws are crossed to transfer the toner from upstream to downstream. At the transfer portion, a downstream side edge of an upstream side screw and an upstream side edge of a downstream side screw are disposed to be crossed, so as to overlap in the vertical direction. When the toner conveyed by the upstream side screw reaches the downstream side edge of the upstream side screw, the toner is guided to the downstream side screw with the assistance of gravity, then the toner is further conveyed to the downstream side by the downstream side screw.

Japanese Patent Application Publication No. 2012-230358 as well discloses a configuration in which two screws are crossed, so that toner is transferred from the upstream side screw to the downstream side screw, and is conveyed. As illustrated in FIG. 5 of Japanese Patent Application Publication No. 2012-230358, in this configuration, the upstream side screw and the downstream side screw cross, so that the toner is conveyed to the downstream side in the conveying direction.

In these prior arts, at the transfer portion from the upstream side screw to the downstream side screw, toner is subject to gravity in addition to the conveying force of the screw. By the totality of gravity and the conveying force of the screw, the toner is pushed out of the conveying passage where the upstream side screw is disposed, and the toner flows into the conveying passage where the downstream side screw is disposed.

In this case, even if a space is created above the screw in the cross-sectional view sectioned in the shaft direction of the screw disposed horizontally, as illustrated in FIG. 9 of Japanese Patent Application Publication No. 2014-157350, the toner is conveyed in the shaft direction of the screw without entering the space.

This indicates that the conveying force which the screw applies to the toner cannot lift the toner upward against the force of gravity. This means that the conveying force in the radial direction generated by the screw is smaller than the gravity applied to the toner. In other words, the conveying force applied to the toner, when the toner is transferred from the upstream side screw to the downstream side screw, is the totality of the conveying force in the radial direction and gravity, and at least half thereof is generated by gravity.

Therefore in the case of the following conditions where gravity becomes resistant to toner conveying, the conveying force for the toner may become insufficient.

(1) is a case where the downstream side screw is located above the upstream side screw in the vertical direction.

As mentioned above, in the case where the toner is conveyed against the force of gravity, toner may not be smoothly conveyed, since the conveying force in the radial direction of the screw alone is insufficient to convey the toner.

(2) is a case where the downstream side screw is inclined so that the disposing angle of the screw increases as the downstream side is approached.

Especially in the case of the configuration where the downstream side screw extends in the vertical direction, the upstream side screw must push the toner from the upstream side conveying passage to the downstream side conveying passage through the connecting port, overcoming the conveying force in the radial direction generated by the downstream side screw. Therefore, in some cases, the conventional type upstream side screw, which has insufficient conveying force, may not resist the backflow force of the downstream side screw.

In the case of the prior art, if such a configuration is used, the conveying efficiency drops because of the transfer portion between the upstream side screw and the downstream side screw, and the maximum conveying force of the entire system drops with respect to the maximum conveying force of each screw.

In a conventional image forming apparatus, the toner amount required by a process cartridge is set, and in order to satisfy this toner amount, the rotation speed of the screw is increased so that the required toner conveying amount becomes sufficient.

However, although the required conveying amount is satisfied, the operating sound increases as the rotation speed increases. Further, the product life of the apparatus decreases, since the cumulative rotation speed of the screws inside the toner conveying apparatus increases during a product life cycle of the image forming apparatus.

Moreover, if the cross-sectional area of the screw is increased to increase the conveying force without increasing the rotation speed of the screws, the volume of the apparatus increases which influences the overall size of the entire image forming apparatus.

Therefore a technique to improve the toner conveying efficiency in a toner conveying passage, where the downstream side is influence more by gravity than the upstream side, will be described next.

Figure 13:
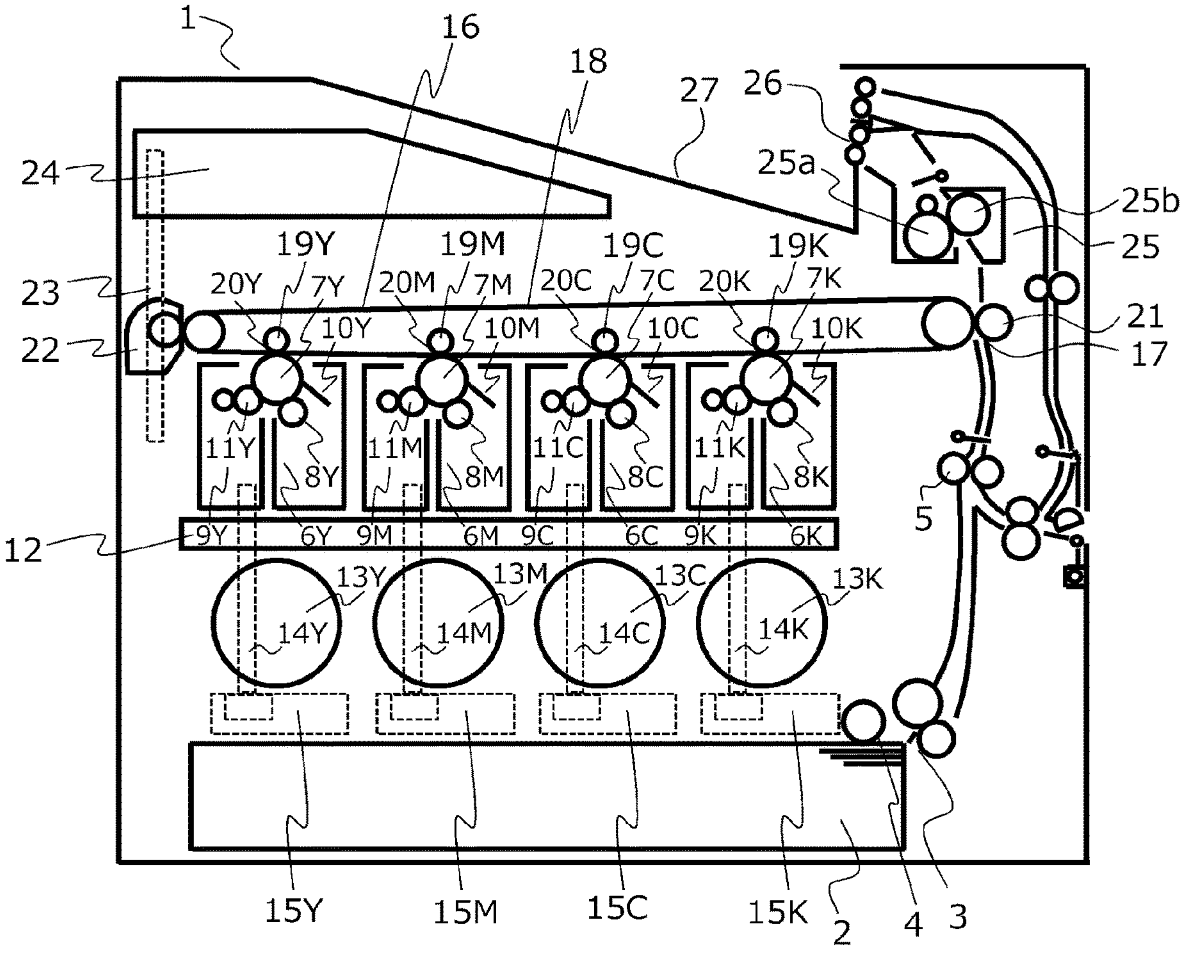
FIG. 13 is a schematic cross-sectional view of an image forming apparatus according to an embodiment of the present invention.

An image forming apparatus 1 according to Embodiment 6 of the present invention will be described with reference to FIG. 13. FIG. 13 is a schematic cross-sectional view illustrating a general configuration of the image forming apparatus 1, and is a cross-sectional view when the image forming apparatus 1 is viewed from the front side. FIG. 13 indicates a configuration of the image forming apparatus in a normal installation state where the image forming apparatus is disposed on a horizontal installation surface, and the left-right direction in FIG. 13 corresponds to the horizontal direction, and the up-down direction in FIG. 13 corresponds to the vertical direction of the apparatus. The content of the description related to the direction (e.g. left-right, up-down) in the following description with reference to drawings other than FIG. 13 is based on FIG. 13.

The image forming apparatus 1 includes, as an image forming unit, an image forming portion 6 constituted of each image forming station 6Y, 6M, 6C and 6K which corresponds to the toner (developer) of each color: yellow (Y), magenta (M), cyan (C) and black (K) respectively, and is disposed horizontally in a line. Inside the image forming portion 6, each photosensitive drum, i.e., image bearing member, 7Y, 7M, 7C and 7K (hereafter photosensitive drum 7) and each charging apparatus 8Y, 8M, 8C and 8K (hereafter charging apparatus 8) which uniformly charges the surface of the photosensitive drum 7, are disposed. Further, each developing apparatus 9Y, 9M, 9C and 9K (hereafter developing apparatus 9), which attaches toner to an electrostatic latent image and develops the image as a toner image (developer image), is disposed. Furthermore, each photosensitive member cleaning blade 10Y, 10M, 10C and 10K (hereafter photosensitive member cleaning blade 10), which removes residual toner remaining on the photosensitive drum 7, is disposed. In the developing apparatus 9, each developing roller 11Y, 11M, 11C and 11K (hereafter developing roller 11) corresponding to each color, is disposed such that contacting to and separating from each photosensitive drum 7 are possible. The developing roller 11 is contacted or released in accordance with the electrostatic latent image, that is, in accordance with the requirements of development, so as to improve the product life of the developing roller 11. Moreover, a scanner unit 12, which emits a laser beam based on the image information and forms an electrostatic latent image on the photosensitive drum 7, is disposed under the image forming portion 6. Each image forming station 6Y, 6M, 6C and 6K is configured as a process cartridge, so as to be detachable from the apparatus main body of the image forming apparatus 1. The process cartridge is configured to attach/detach the developing apparatus 9 equipped with the developing roller 11 and the photosensitive unit equipped with: the photosensitive drum 7, the charging apparatus 8 and the cleaning blade 10, to/from the apparatus main body individual or integrally. In Embodiment 6, the developing apparatus 9 includes its own toner containing chamber, so that toner supplied from a later mentioned replenishing toner container (toner cartridge) 13 is replenished to the toner containing chamber. Here the apparatus main body of the image forming apparatus 1 is referred to as the image forming apparatus, excluding the configuration that is detachable from the image forming apparatus 1, such as the above mentioned process cartridge and the later mentioned replenishing toner container 13.

In a lower part of the image forming apparatus 1, a drawer-shaped cassette 2 is housed. In a cassette 2, recording material 4, such as papers and sheets, is stored. The recording material 4 is separated and fed one-by-one by rotation of the paper feeding cassette portion 3 which is disposed near the front end of the recording material 4. Then each sheet of the recording material 4 is conveyed downstream by a resist roller 5.

An intermediate transfer unit 16 is disposed above the developing apparatus 9. The intermediate transfer unit 16 is disposed in an approximately horizontal position, so that the lower part thereof is the side facing each image forming station (image forming portion) 6 (on the side of a primary transfer portion 20). An intermediate transfer belt 18, which faces each photosensitive drum 7, is a rotatable endless belt, and is stretched by a plurality of stretching rollers. Each primary transfer roller 19Y, 19M, 19C and 19K (hereafter primary transfer roller 19) is disposed on the inner surface side of the intermediate transfer belt 18 as a primary transfer member. Each primary transfer roller 19 is disposed at a position so as to form each primary transfer portion 20Y, 20M, 20C and 20K (hereafter primary transfer portion 20) with each photosensitive drum 7 respectively via the intermediate transfer belt 18. A toner image is transferred from each photosensitive drum 7 to the intermediate transfer belt 18 in each primary transfer portion 20 by the primary transfer roller 19 to which voltage is applied. In Embodiment 6, a unit constituted of the intermediate transfer belt 18, a plurality of stretching rollers to stretch the intermediate transfer belt 18, and each primary transfer roller 19, can be detachable from the apparatus main body as an intermediate transfer unit 16.

The toner image developed by each image forming station is transferred to the intermediate transfer belt 18 by the primary transfer portion 20, and by sequentially transferring each color, a four-color toner image is formed on the surface of the intermediate transfer belt 18, and is conveyed to a secondary transfer portion 17.

In a lower part of the image forming portion 6, each replenishing toner container (toner replenishing cartridge) 13Y, 13M, 13C and 13K (hereafter replenishing toner container 13), which replenishes toner to each image forming station (image forming portion) 6, is detachably disposed approximately horizontally between the scanner unit 12 and the cassette 2. Replenishing toner corresponding to each color is filled in the replenishing toner container 13. Each toner conveying apparatus 14Y, 14M, 14C and 14K (hereafter toner conveying apparatus 14) conveys toner received from the replenishing toner container 13 upward in accordance with the consumption of toner inside the image forming unit 6, and supplies the toner to the developing apparatus 9. The toner conveying apparatus 14 is driven by each toner conveying driving apparatus 15Y, 15M, 15C and 15K (hereafter toner conveying driving apparatus 15), which is a driving unit disposed below the toner conveying apparatus 14. The toner conveying driving apparatus 15 includes: a motor, i.e., power source, to provide driving force to drive each screw of the toner conveying apparatus 14 to the toner conveying apparatus 14 via a later mentioned upstream side driving gear 303 and downstream side driving gear 112 and the like; and a gear which functions as a driving transfer unit.

A secondary transfer roller 21, which is a secondary transfer member, contacts the intermediate transfer belt 18 so as to form a secondary transfer portion 17 with a roller on the opposite side via the intermediate transfer belt 18. The toner image transferred onto the intermediate transfer belt 18 by the secondary transfer portion 17 is secondarily transferred to the recording material 4. Toner that remains on the intermediate transfer belt 18 without being transferred to the recording material 4 in the secondary transfer is removed by a cleaning unit 22. The toner removed by the cleaning unit 22 is conveyed to a toner collecting container 24 via a toner conveying portion 23, and stored in the toner collecting container 24.

The recording material 4 onto which an unfixed toner image is transferred by the secondary transfer portion 17 is further conveyed to the downstream side, and is heated and pressed by a heating unit 25*a* and a pressure roller 25*b* of the fixing apparatus 25, and the toner image is fixed to the recording material 4 by the melted toner. Then the recording material 4 is conveyed by a discharging roller pair 26 and discharged to a paper delivery tray 27. By this series of operations, an image is formed on the surface of the recording material 4.

Toner Conveying Apparatus

Figure 11:
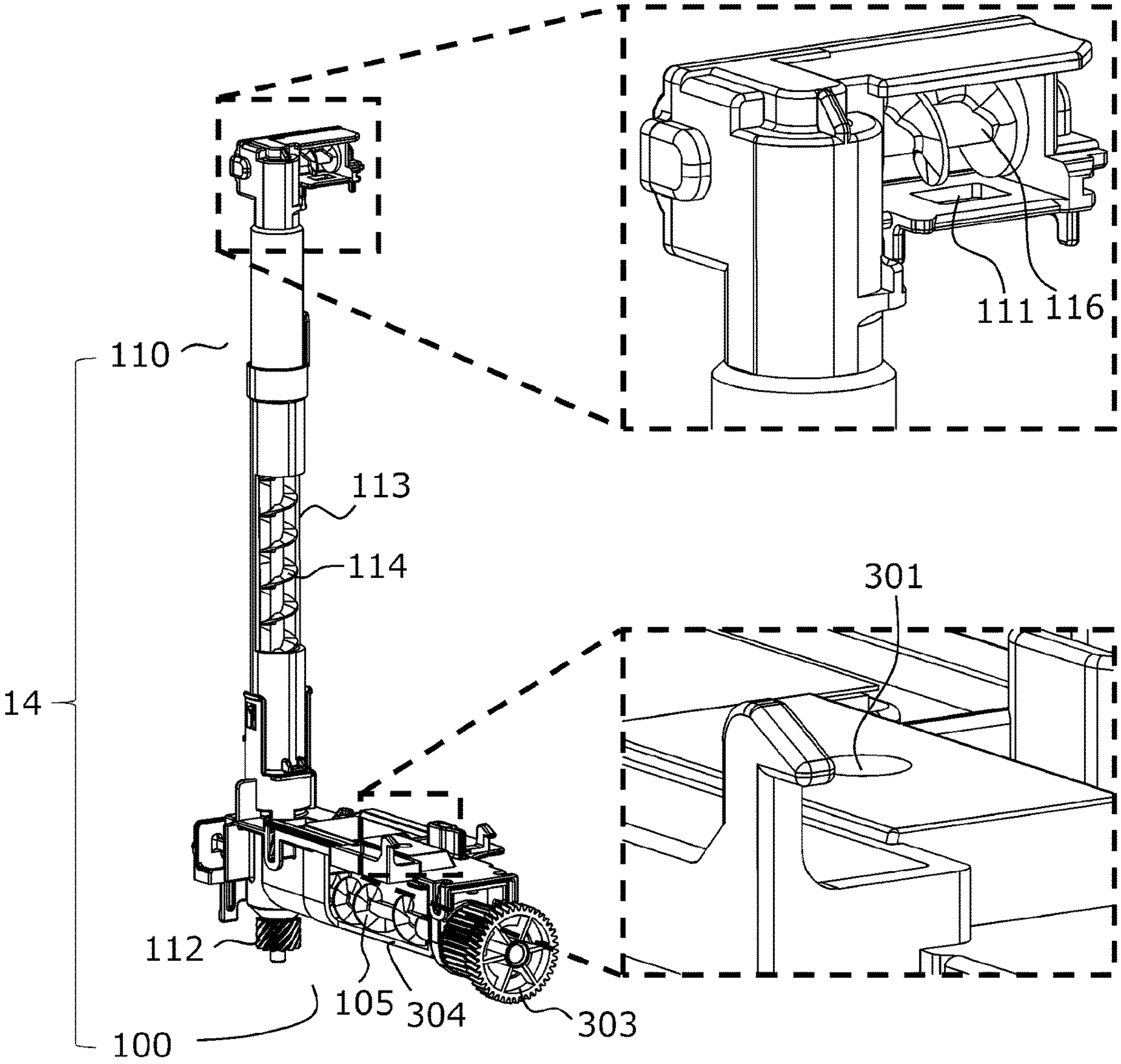
FIG. 11 is a perspective view of a toner conveying apparatus according to Embodiment 6 of the present invention.

FIG. 11 is a schematic perspective view illustrating a general configuration of the toner conveying apparatus 14 equipped in the image forming apparatus of Embodiment 6. In the illustration in FIG. 11, a part of the toner conveying apparatus 14 is omitted in order to indicate the internal configuration thereof.

The toner conveying apparatus 14 is largely constituted of an upstream side conveying portion 100 and a downstream side conveying portion 110.

A supply port 301 is disposed on the upper surface of the upstream side conveying portion 100, and the toner supplied from the replenishing toner container 13 illustrated in FIG. 13 is supplied to into the first toner conveying passage which is formed by an upstream side wall surface 304 inside the upstream side conveying portion 100 through the supply port 301. The supplied toner is conveyed by rotation of an upstream side screw 105, i.e., first screw disposed so as to be covered by an upstream side wall surface 304 inside the upstream side conveying portion 100. The upstream side screw 105 is rotary-driven by the rotary-driving force transferred from the toner conveying driving apparatus 15 to an upstream side driving gear 303, and the upstream side screw 105 conveys the toner toward the downstream side conveying portion 110.

The upstream side conveying portion 100 includes: a first conveying passage forming member that forms an upstream side first toner conveying passage 108; a second conveying passage forming member that forms a part of the upstream side of a downstream side second toner conveying passage 109; and a connecting port 107 that connects the first toner conveying passage 108 and the second toner conveying passage 109.

The upstream side screw 105 includes a rotation shaft 105A, i.e., first rotation shaft, and a blade portion 105B which is disposed helically around the outer periphery of the rotation shaft 105A.

The upstream side screw 105 is rotatably disposed in an approximately horizontal direction inside the first toner conveying passage 108, which extends in an approximately horizontal direction and is formed by the first conveying passage forming member, out of the conveying passage formed by the upstream side conveying portion 100. The upstream side screw 105 is configured such that the edge of the rotation shaft 105A on the side, which is drive-coupled with the upstream side driving gear 303 (upstream side edge of the upstream side conveying portion 100 in the toner conveying direction), is rotatably supported by a casing of the upstream side conveying portion 100.

The connecting port 107 is disposed so as to be connected to the first toner conveying passage 108 along the axial line direction of the rotation shaft 105A of the upstream side screw 105.

In the upstream side conveying portion 100, a part of the upstream side of the second toner conveying passage 109, formed by the second conveying passage forming member, has its upstream end at the tip (downstream side) of the connecting port 107 in the axial line direction of the rotation shaft 105A, and extends upward (direction opposite the gravity direction) from this upstream end.

In other words, the conveying passage formed by the upstream side conveying portion 100 has an approximately L shape constituted of the first toner conveying passage 108, the connecting port 107, and a part of the upstream side of the second toner conveying passage 109.

The downstream side conveying portion 110 includes the second conveying passage forming member that forms the second toner conveying passage 109, which extends approximately vertically (direction opposite the gravity direction) at the downstream of the first toner conveying passage 108. The second conveying passage forming member of the downstream side conveying portion 110 forms a major part 109*b* of the second toner conveying passage 109, excluding a part 109*a* on the upstream side of the second toner conveying passage 109 formed by the second conveying passage forming member of the upstream side conveying portion 100. In other words, part 109*a* on the upstream side of the second toner conveying passage 109 is formed by the upstream side conveying portion 100, and from here the downstream side 109*b* is formed by the downstream side conveying portion 110. This means that the second conveying passage forming member which forms the second toner conveying passage 109 extends over the upstream side conveying portion 100 and the downstream side conveying portion 110.

The second conveying passage forming member of the upstream side conveying portion 100 has an opening portion which opens the second toner conveying passage 109 upward, and is configured such that the lower end (upstream side end) of the second conveying passage forming member of the downstream side conveying portion 110 is inserted into the opening portion from the upper part. By this connection, the second toner conveying passage 109*a* of the upstream side conveying portion 100 and the second toner conveying passage 109*b* of the downstream side conveying portion 110 are connected, whereby one second toner conveying passage 109 is formed.

The first toner conveying passage 108 is a space created between the upstream side wall surface 304 of the upstream side conveying portion 100 and the upstream side screw 105.

The second toner conveying passage 109 is a space created between a downstream side wall 113 extending over the upstream side conveying portion 100 and the downstream side conveying portion 110, and a downstream side screw 114.

The downstream side screw 114, i.e., second screw is rotatably disposed in the vertical direction inside the second toner conveying passage 109, and is housed extending over the part (109*b*) inside the downstream side conveying portion 110 and a part (109*a*) inside the upstream side conveying portion 100.

Inside the downstream side conveying portion 110, the downstream side screw 114 is disposed so as to be covered by the downstream side wall surface 113. The most upstream side portion of the downstream side conveying portion 110 is connected to the most downstream portion of the upstream side conveying portion 100, and the toner conveyed by the upstream side screw 105 of the upstream side conveying portion 100 passes through the connecting port 107, and is then conveyed by the downstream side screw 114. The downstream side screw 114 is rotary-driven by the rotary-driving force transferred from the toner conveying driving apparatus 15 to the downstream side driving gear 112, and the downstream side screw 114 conveys the toner in the opposite direction of the gravity direction. The downstream side screw 114 is configured such that the edge of the rotation shaft 114A on the side which is drive-coupled with the downstream side driving gear 112 (upstream side edge of the downstream side conveying portion 110 in the toner conveying direction) is rotatably supported by the casing of the downstream side conveying portion 110. The toner conveyed in a direction opposite the gravity direction by the downstream side screw 114 is further conveyed by a discharging screw 116, i.e., third screw, and is discharged from the downstream side conveying portion 110 via a discharging port 111. An upstream side edge of the blade portion of the discharging screw 116 contacts a downstream side edge of the blade portion of the downstream side screw 114 so as to be drive-coupled, and the discharging screw 116 is rotated by the driving force received from the rotating downstream side screw 114. The toner discharged from the discharging port 111 by the discharging screw 116 is supplied (replenished) to the developing apparatus 9 illustrated in FIG. 13.

Figure 12A:
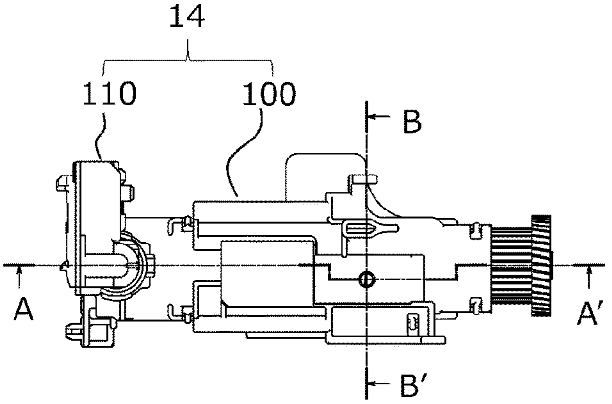
FIG. 12A to FIG. 12C are explanatory drawings of the toner conveying apparatus according to Embodiment 6 of the present invention.
Figure 12C:
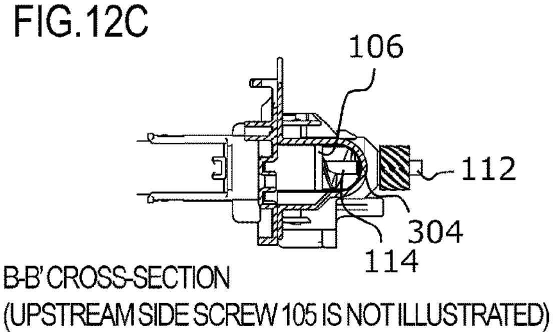
Figure 12B:
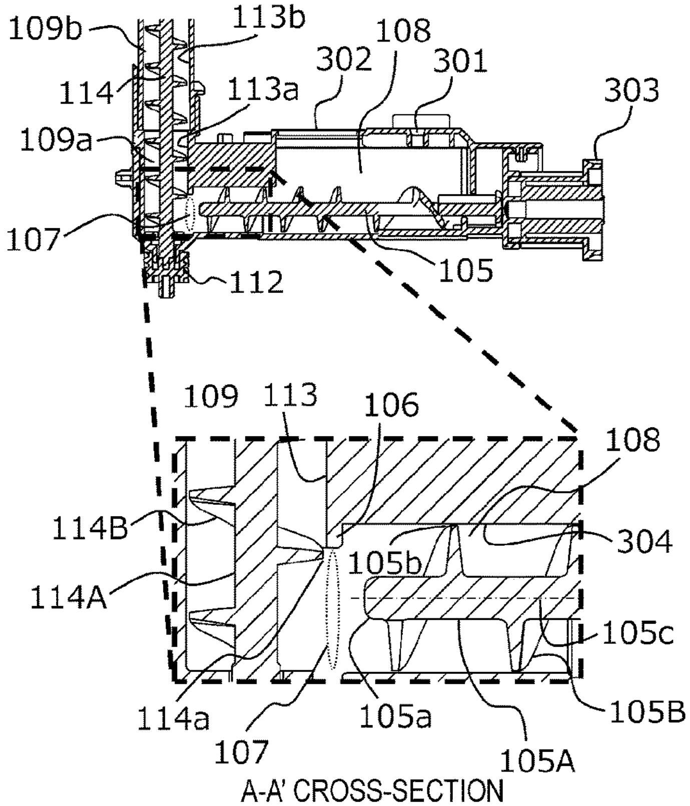

FIG. 12A to FIG. 12C are diagrams illustrating a detailed configuration of a connecting portion (connecting port 107) between the above mentioned first toner conveying passage 108 and second toner conveying passage 109. FIG. 12A is a top view of the toner conveying apparatus 14, FIG. 12B is a cross-sectional view at A-A' in FIG. 12A, illustrating only the connecting portion of the toner conveying apparatus 14, and FIG. 12C is a cross-sectional view at B-B' in FIG. 12A.

As illustrated in FIG. 12B, a degassing member 302 is disposed on the upper surface of the upstream side conveying portion 100. The degassing member 302 is constituted of a non-woven fabric so that air is passed without passing toner. If this degassing member 302 were not used, the air pressure in the space inside the upstream side conveying portion 100 would increase when the toner is supplied from the replenishing toner container 13 illustrated in FIG. 13. An increase in this air pressure generates a pressure difference from the pressure in the replenishing toner container 13, whereby toner is not supplied from the replenishing toner container 13 into the upstream side conveying portion 100.

The toner supplied from the replenishing toner container 13 is first conveyed by the upstream side screw 105, and is then conveyed by the downstream side screw 114. A space is created between a downstream end 105*a* of the rotation shaft 105A of the upstream side screw 105, and an outer diameter end 304*a* of the blade portion 114B of the downstream side screw 114, in the axial line direction of the rotation shaft 105A. The region where this space is created can be regarded as the connecting port 107. The length of this space (connecting length of the connecting port 107) can be appropriately set in accordance with the specification of the apparatus, based on the length for which the toner in the space (inside the connecting port 107) can be conveyed to the second toner conveying passage 109 on the downstream side by the rotary conveying force of the upstream side screw 105.

In the second toner conveying passage 109 on the downstream side of this space (connecting port 107), the downstream side screw 114 conveys toner in a direction opposite the gravity direction, and also the upstream side screw 105 rotary-drives to supply toner toward the downstream side screw 114. At this time, in some cases, toner may flow back from the downstream side screw 114 toward the upstream side screw 105. In other words, toner descending inside the second toner conveying passage 109 by gravity returns to the first toner conveying passage 108 via the space (connecting port 107). This back flow of the toner may drop efficiency of transferring toner from the upstream side screw 105 to the downstream side screw 114.

The force to convey the toner by the upstream side screw 105, which extends in the horizontal direction, is mainly generated in a region below the rotation axial line 105*c* of the rotation shaft 105A. Therefore back flow of the toner is generated mainly in a region above the rotation axial line 105*c*, and at the same time, the flow of toner from the upstream side screw 105 to the downstream side screw 114 is generated in the region below the rotation axial line 105*c*.

Therefore a back flow prevention rib (protruding portion) 106 is disposed at the connecting port 107, which is a connection portion between the first toner conveying passage 108 and the second toner conveying passage 109. This back flow prevention rib 106 is continuously formed from the inner wall surface 113 constituting the second toner conveying passage 109 along the rotation axial line direction of the rotation shaft 114A of the downstream side screw 114, so as to cover the outer diameter end (outer periphery end) 114*a* of the blade portion 114B of the downstream side screw 114. Furthermore, the back flow prevention rib 106 is formed so as to protrude from a region covering the upper end in the gravity direction (upper end of inner wall surface 304) of the outer diameter end (outer periphery end) 105*b* of the blade portion 105B of the upstream side screw 105, that is, from a part of the inner wall surface 304 constituting the first toner conveying passage 108. In other words, the back flow prevention rib 106 protrudes from the inner wall surface 304 toward the rotation axial line 105*c* in the direction perpendicular to the rotation axial line 105*c* of the rotation shaft 105A. The back flow prevention rib 106 is disposed so as to overlap with the blade portion 105B when viewed in the direction of the rotation axial line 105*c* of the rotation shaft 105A. Because of the back flow prevention rib 106, the width of the connecting portion (connecting port 107) between the first toner conveying passage 108 and the second toner conveying passage 109 becomes narrower than the width of the space of a region that is on the downstream side of the downstream side edge of the rotation shaft 105A of the first toner conveying passage 108.

For the protruding amount of the back flow prevention rib 106 from the inner wall surface 304, it is critical that the back flow prevent rib 106 protrudes toward the rotation axial line (rotation center shaft) 105*c* from the outer diameter end 105*b* of the upstream side screw 105, and is located upward from the rotation center shaft 105*c* in the vertical direction, when viewed in the direction along the rotation center shaft 105*c*. By forming the back flow prevention rib 106 within this protruding amount range, the toner back flow amount, from the downstream side screw 114 to the upstream side screw 105, can be decreased without dropping the toner transfer amount from the upstream side screw 105 to the downstream side screw 114.

The back flow prevention rib 106 is formed by one continuous rib, but may be formed intermittently by a plurality of ribs. In Embodiment 6, the tip of the back flow prevention rib 106 is on a horizontal line along the rotation axial line 105*c*, as illustrated in FIG. 12C, but this may be an arc or diagonal line.

According to Embodiment 6, even in the case of a configuration of the conveying passages, where the influence of gravity is larger in the downstream side than in the upstream side and conveying toner is difficult, the toner conveying efficiency does not drop at the joining portion of the conveying passages at which the toner conveying direction changes in such a way where the influence of gravity increases, and such minuses as an increase in operating sound and drop in product life can be prevented. In other words, according to Embodiment 6, when at least two screws are connected, toner can be efficiently transferred to the downstream side screw at the toner transfer portion, utilizing the conveying force of the upstream side screw. Thereby the rotation speed of the screw, with respect to the required toner conveying amount, can be minimized, and as a result, power can be saved and noise reduced. In the same manner, the outer diameter of the screw, with respect to the required toner convey amount, can be minimized, and as a result, the entire apparatus can be downsized.

Embodiment 7

Figure 14:
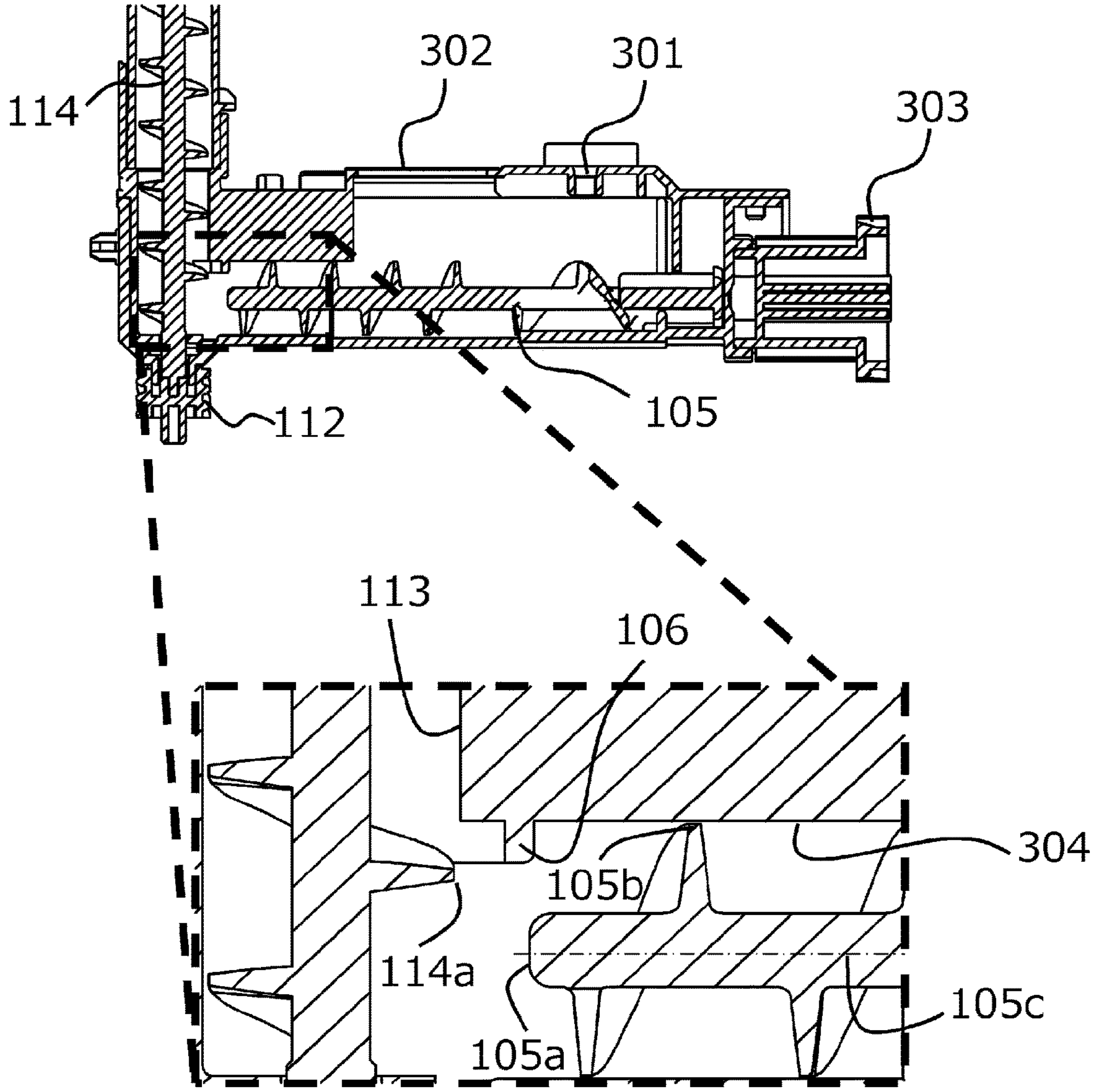
FIG. 14 is a schematic cross-sectional view of a toner conveying apparatus according to Embodiment 7 of the present invention.

Embodiment 7 of the present invention will be described with reference to FIG. 14. FIG. 14 is a schematic cross-sectional view illustrating a detailed configuration of the connecting portion (connecting port 107) between the first toner conveying passage 108 and the second toner conveying passage 109 in the toner conveying apparatus according to Embodiment 7.

In the configuration of the image forming apparatus and the toner conveying apparatus according to Embodiment 7, a composing element the same as the apparatus configuration according to Embodiment 6 is denoted with a same reference sign, and redundant description thereof is omitted. Matters not especially described in Embodiment 7 are the same as Embodiment 6.

In Embodiment 7, unlike Embodiment 6, the back flow prevention rib 106 protrudes from the inner wall surface 304 constituting the first toner conveying passage 108, independently (not continuously) from the inner wall surface 113 constituting the second toner conveying passage 109. This is based on the assumption that the back flow prevention rib 106 cannot be formed continuously from the inner wall surface 113 because of the limitations of the dies used to mold the upstream side conveying portion 100 and the downstream side conveying portion 110. According to Embodiment 7, the back flow amount of the toner from the downstream side screw 114 to the upstream side screw 105 can be decreased without dropping the toner transfer amount from the upstream side screw 105 to the downstream side screw 114, regardless the limitations of the dies.

Configuration Example of Back Flow Prevention Rib (Protruding Portion)

Figure 15A:
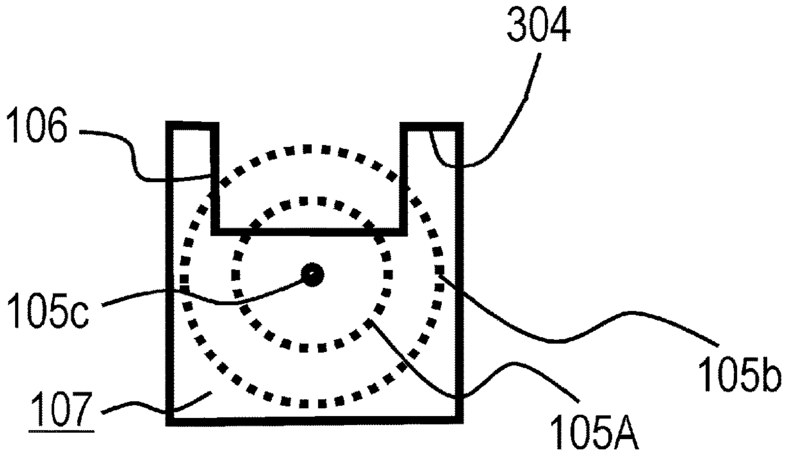
FIG. 15A to FIG. 15C are schematic diagrams illustrating configuration examples of a backflow prevention rib (protruding portion) according to an embodiment of the present invention.
Figure 15B:
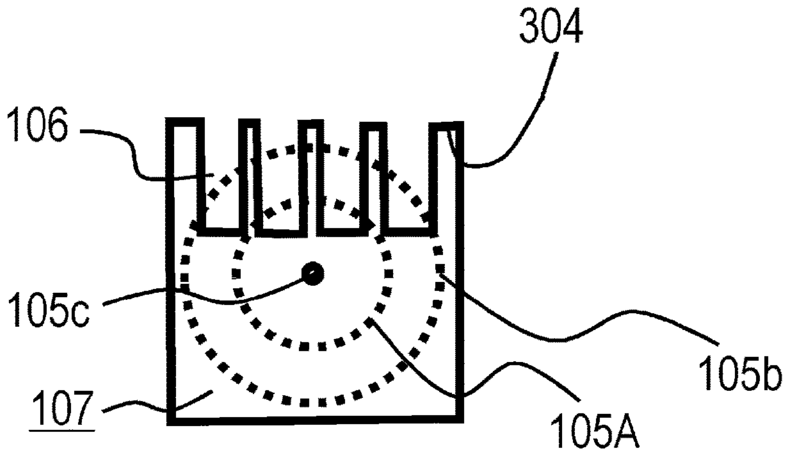
Figure 15C:
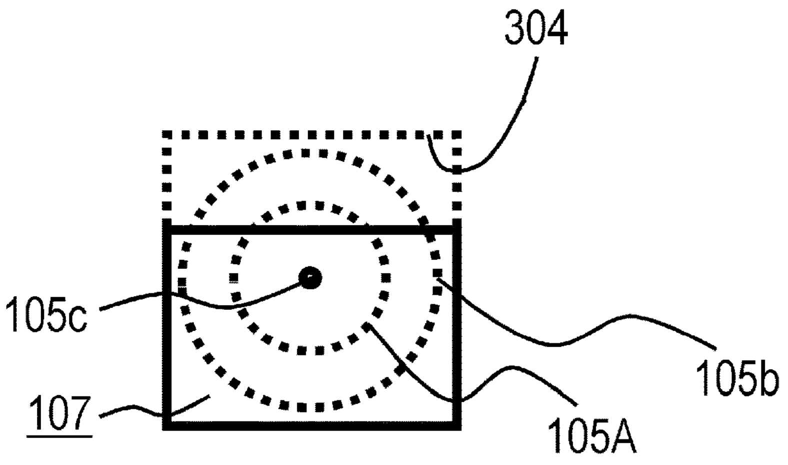

A configuration example of the back flow prevention rib 106 will be described with reference to FIG. 15A to FIG. 15C. FIG. 15A to FIG. 15C are schematic diagrams illustrating configuration examples of the rotation shaft 105A of the upstream side screw 105, the back flow prevention rib 106, the connecting port 107 and the inner wall surface 304 constituting the first toner conveying passage 108, when viewed along the rotation axial line 105*c* of the rotation shaft 105A of the upstream side screw 105. FIG. 15A is a configuration of a single back flow prevention rib 106 described in the above embodiments, and FIG. 15B is a configuration when a plurality of back flow prevention ribs 106 are disposed. FIG. 15C is a configuration which does not include the back flow prevention rib 106, and reduces the back flow of toner by optimizing the positional relationship between the connecting port 107 and the rotation shaft 105A.

A specific configuration of the back flow prevention rib 106 is not limited to the configurations of the above embodiment. In other words, for the connecting port 107, various configurations may be used as long as the flow of the toner in a region above the rotation axial line 105*c* of the rotation shaft 105A of the upstream side screw 105, where the back flow of toner is easily generated, is interrupted, and the flow of toner in a region below the rotation axial line 105*c* is not interrupted. In other words, another configuration that does not use the back flow prevention rib 106 may be used, as long as the width of the connecting port 107 can be set such that the region above the rotation axial line 105*c* is narrower than the region below the rotation axial line 105*c*. For example, as illustrated in FIG. 15C, the degree of the opening of the connecting port 107 is set so that the region above the rotation axial line 105*c* is narrower than the region below the rotation axial line 105*c*, whereby an effect similar to the configuration using the back flow prevention rib 106, described in the above embodiment, can be implemented. The connecting port 107 is configured to have a rectangular shape in FIG. 15A to FIG. 15C, but is not limited to this shape. The connecting port 107 may have a variety of shapes, such as a circle or polygon. The same is true for the shape of the back flow prevention rib 106.

Other

The configuration combining members that constitute the first toner conveying passage, the connecting port and the second toner conveying passage (position where the upstream side conveying portion 100 and the downstream side conveying portion 110 are separated) is not limited to the above mentioned configuration of the embodiments.

For example, the upstream side conveying portion 100 and the downstream side conveying portion 110 may be separated at the connecting port 107. In other words, in the upstream side conveying portion 100, a first opening portion which opens at the downstream end of the first toner conveying passage 108 is disposed, and in the downstream side conveying portion 110, a second opening portion which opens at the upstream end of the second toner conveying passage 109 is disposed so as to be connected to the first opening portion along the axial line of the rotation shaft 105A of the upstream side screw 105. Thereby the connecting port 107 can be formed by the first opening portion and the second opening portion which are connected along the axial line of the rotation shaft 105A of the upstream side screw 105. Then by disposing the back flow prevention rib (protruding portion) at an edge of at least one of the first opening portion and the second opening portion, or by differentiating the width of the opening portions, the toner back flow amount can be decreased.

Further, regarding the portion of the connecting port 107 as a third toner conveying passage of which conveying distance is short, a third conveying passage forming portion constituting the third toner conveying passage may be configured as a member that is different from the first conveying passage forming member constituting the first toner conveying passage 108 and the second conveying passage forming member constituting the second toner conveying passage 109. In this case, the width of the third toner conveying passage constituted by the third conveying passage forming portion is narrower than the width of the downstream side opening portion of the first toner conveying passage 108 constituted by the first conveying passage forming member in a region above the rotation axial line of the rotation shaft 105A. Further, in this case, the third toner conveying passage becomes a toner conveying passage inside in which a conveying unit (e.g. screw) is not disposed. Therefore the length of the third toner conveying passage is the length for which the toner inside the third toner conveying passage can be conveyed to the second toner conveying passage 109 on the downstream side, by the rotary-conveying force of the first screw disposed in the first toner conveying passage 108 on the upstream side.

In the toner conveying apparatus of the above Embodiments, a configuration where the upstream side is the conveying passage to convey toner in the horizontal direction, and the downstream side is the conveying passage to convey toner upward in the vertical direction, was described, but the configuration of the conveying passage is not limited to this. In other words, the present invention can be suitably applied to a conveying passage where the influence of gravity on toner conveying increases in the direction toward the downstream side of the conveying passage, as in the case of the conveying passage of the embodiments. For example, in the configurations of the embodiments, the first toner conveying passage 108 (the rotation shaft 105A of the upstream side screw 105) may have a slight angle (elevation angle) with respect to the horizontal plane. In this case, even if the second toner conveying passage 109 (the rotation shaft 114A of the downstream side screw 114) has a slight angle with respect to the vertical direction, the conveying passage configuration where the influence of gravity is strong on the downstream side can still be established as long as the angle from the horizontal plane (elevation angle) of the second toner conveying passage 109 is larger than the angle of the first toner conveying passage 108 (the rotation shaft 105A of the upstream side screw 105). In such a configuration as well, the present invention can be suitable applied, and a similar effect as the embodiments can be acquired. The change in the angle of the conveying passage from the horizontal plane is not limited to one change in a direction from the horizontal line toward the vertical line, as described in the embodiments, but may be gradually changed twice or more, or may be changed to be curve-shaped. In such a case as well, the present invention can be suitably applied.

The toner conveying apparatus of the present invention can be applied not only to conveying new toner, as described in the above embodiments, but also to conveying waste toner, such as untransferred toner. In this case, such particles as paper dust, generated from recording material, may be included in the conveying target particles, but the main conveying target is still waste toner. Therefore the conveying target particles can be efficiently conveyed using the same configuration as the above embodiments, in the same manner as the above embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-207220, filed on Nov. 15, 2019, No. 2019-207246, filed on Nov. 15, 2019, and No. 2019-207170, filed on Nov. 15, 2019, which are hereby incorporated by reference herein in their entirety.

What is claimed is:

1. An image forming apparatus comprising:

(i) a cartridge including a photosensitive drum and a cleaning member that cleans a surface of the photosensitive drum by removing a toner remaining on the surface of the photosensitive drum, (ii) a toner container for containing the removed toner, and (iii) an apparatus main body to and from which the cartridge and the toner container are independently attached and detached, the apparatus main body including (iii-i) a toner conveying apparatus configured to receive the removed toner from the cartridge and convey the removed toner to the toner container, the toner container being disposed above the cartridge in a gravitational direction, the toner conveying apparatus including:

(iii-i-i) a first conveying portion configured to convey the removed toner received from the cartridge toward the toner container, the first conveying portion having a first screw that includes a first rotation shaft and a first blade portion and that is rotatable about a first rotation axial line, the first conveying portion including a first conveying passage forming member that forms a first conveying space in which the first screw is provided and that has a receiving port for receiving the removed toner from the cartridge and a discharging port through which the removed toner conveyed by the first screw is discharged from the first conveying passage forming member, and (iii-i-ii) a second conveying portion configured to convey the removed toner conveyed by the first conveying portion toward the toner container, the second conveying portion having a second screw that includes a second rotation shaft and a second blade portion and that is rotatable about a second rotation axial line, the second conveying portion including a second conveying passage forming member that forms a second conveying space in which the second screw is provided, the second conveying passage forming member being in communication with the first conveying passage forming member through the discharging port, wherein the first conveying space of the first conveying portion includes a first region and a second region that is closer to the discharging port than the first region is to the discharging port in a toner conveying direction of the first screw, and wherein a cross-sectional area of a first space between the first rotation shaft and an inner wall of the first conveying passage forming member in the second region and which is orthogonal to the first rotation axial line is smaller than a cross-sectional area of a second space between the first rotation shaft and the inner wall of the first conveying passage forming member in the first region and which is orthogonal to the first rotation axial line.

2. The image forming apparatus according to claim 1, wherein the second rotation axial line of the second rotation shaft extends in the gravitational direction.

3. The image forming apparatus according to claim 1, wherein the discharging port overlaps with the first screw when viewed in a direction perpendicular to the first rotation axial line.

4. The image forming apparatus according to claim 3, wherein the discharging port is provided in the inner wall of the first conveying passage forming member and opens in a direction perpendicular to the first rotation axial line.

5. The image forming apparatus according to claim 1, wherein a second diameter of the first rotation shaft in the second region is smaller than a first diameter of the first rotation shaft in the first region.

6. The image forming apparatus according to claim 1, wherein an inner diameter of the first conveying passage forming member in the second region is smaller than an inner diameter of the first conveying passage forming member in the first region.

7. The image forming apparatus according to claim 1, wherein an inner diameter of the first conveying passage forming member in the second region is equal to an inner diameter of the first conveying passage forming member in the first region, and wherein a second diameter of the first rotation shaft in the second region is larger than a first diameter of the first rotation shaft in the first region.

8. The image forming apparatus according to claim 1, wherein the first screw overlaps with the second screw when viewed in a direction perpendicular to the first rotation axial line.

9. The image forming apparatus according to claim 1, wherein the discharge port is provided in the inner wall of the first conveying passage forming member and opens in a horizontal direction, and wherein the first screw overlaps with the discharge port when viewed in the horizontal direction.

10. The image forming apparatus according to claim 1, wherein an end portion of the first screw in the toner conveying direction of the first screw is a free end.

11. A toner conveying apparatus comprising:

(i) a first conveying portion configured to convey toner, the first conveying portion having a first screw that includes a first rotation shaft and a first blade portion and that is rotatable about a first rotation axial line, the first conveying portion including a first conveying passage forming member that forms a first conveying space in which the first screw is provided and that has a receiving port for receiving the toner from outside of the first conveying passage forming member and a discharging port through which the toner conveyed by the first screw is discharged from the first conveying passage forming member, and (ii) a second conveying portion configured to convey the toner conveyed by the first conveying portion upward, the second conveying portion having a second screw that includes a second rotation shaft and a second blade portion and that is rotatable about a second rotation axial line, the second conveying portion including a second conveying passage forming member that forms a second conveying space in which the second screw is provided, the second conveying passage forming member being in communication with the first conveying passage forming member through the discharging port, wherein the first conveying space of the first conveying portion includes a first region and a second region that is closer to the discharging port than the first region is to the discharging port in a toner conveying direction of the first screw, and wherein a cross-sectional area of a space between the first rotation shaft and an inner wall of the first conveying passage forming member in the second region and which is orthogonal to the first rotation axial line is smaller than a cross-sectional area of a space between the first rotation shaft and the inner wall of the first conveying passage forming member in the first region and which is orthogonal to the first rotation axial line.

12. The toner conveying apparatus according to claim 11, wherein an inner diameter of the first conveying passage forming member in the second region is smaller than an inner diameter of the first conveying passage forming member in the first region.

13. The toner conveying apparatus according to claim 11, wherein an inner diameter of the first conveying passage forming member in the second region is equal to an inner diameter of the first conveying passage forming member in the first region, and wherein a second diameter of the first rotation shaft in the second region is larger than a first diameter of the first rotation shaft in the first region.

14. The toner conveying apparatus according to claim 11, wherein the discharge port is provided in the inner wall of the first conveying passage forming member and opens in a horizontal direction, and wherein the first screw overlaps with the discharge port when viewed in the horizontal direction.

15. The toner conveying apparatus according to claim 11, wherein an end portion of the first screw in the toner conveying direction of the first screw is a free end.

* * * * *